United States Patent
Perkins et al.

(10) Patent No.: US 12,506,440 B2
(45) Date of Patent: Dec. 23, 2025

(54) PHOTOVOLTAIC MODULES WITH ENERGY STORAGE COMPONENTS

(71) Applicant: GAF Energy LLC, Parsippany, NJ (US)

(72) Inventors: Richard Perkins, San Jose, CA (US); Hasib Amin, Parsippany, NJ (US)

(73) Assignee: GAF Energy LLC, Parsippany, NJ (US)

(*) Notice: Subject to any disclaimer, the term of this patent is extended or adjusted under 35 U.S.C. 154(b) by 0 days.

(21) Appl. No.: 18/583,580

(22) Filed: Feb. 21, 2024

(65) Prior Publication Data

US 2024/0291428 A1 Aug. 29, 2024

Related U.S. Application Data

(60) Provisional application No. 63/580,871, filed on Sep. 6, 2023, provisional application No. 63/487,450, filed on Feb. 28, 2023.

(51) Int. Cl.
*H02S 40/38* (2014.01)
*H10F 19/85* (2025.01)
*H02S 20/23* (2014.01)

(52) U.S. Cl.
CPC .......... *H02S 40/38* (2014.12); *H10F 19/85* (2025.01); *H02S 20/23* (2014.12)

(58) Field of Classification Search
None
See application file for complete search history.

(56) References Cited

U.S. PATENT DOCUMENTS

| | | |
|---|---|---|
| 1,981,467 A | 11/1934 | Radtke |
| 3,156,497 A | 11/1964 | Lessard |
| 3,581,779 A | 6/1971 | Gilbert, Jr. |
| 4,258,948 A | 3/1981 | Hoffmann |
| 4,349,220 A | 9/1982 | Carroll et al. |
| 4,499,702 A | 2/1985 | Turner |
| 4,636,577 A | 1/1987 | Peterpaul |
| 5,167,579 A | 12/1992 | Rotter |
| 5,437,735 A | 8/1995 | Younan et al. |

(Continued)

FOREIGN PATENT DOCUMENTS

| | | |
|---|---|---|
| CA | 2829440 A | 5/2019 |
| CH | 700095 A2 | 6/2010 |

(Continued)

OTHER PUBLICATIONS

Sunflare, Procducts: "Sunflare Develops Prototype For New Residential Solar Shingles"; 2019 <<sunflaresolar.com/news/sunflare-develops-prototype-for-new-residential-solar-shingles>> retrieved Feb. 2, 2021.

(Continued)

*Primary Examiner* — Daniel P Malley, Jr.
(74) *Attorney, Agent, or Firm* — GREENBERG TRAURIG, LLP

(57) ABSTRACT

A system includes a plurality of photovoltaic modules installed on a roof deck. Each of the photovoltaic modules includes at least one solar cell, an encapsulant encapsulating the at least one solar cell, a frontsheet, a backsheet, a headlap portion, and an energy storage device between the roof deck and the backsheet. The energy storage device is in electrical communication with the at least one solar cell.

18 Claims, 6 Drawing Sheets

(56) References Cited

U.S. PATENT DOCUMENTS

| | | |
|---|---|---|
| 5,590,495 A | 1/1997 | Bressler et al. |
| 5,642,596 A | 7/1997 | Waddington |
| 6,008,450 A | 12/1999 | Ohtsuka et al. |
| 6,033,270 A | 3/2000 | Stuart |
| 6,046,399 A | 4/2000 | Kapner |
| 6,201,180 B1 | 3/2001 | Meyer et al. |
| 6,220,329 B1 | 4/2001 | King et al. |
| 6,308,482 B1 | 10/2001 | Strait |
| 6,320,114 B1 | 11/2001 | Kuechler |
| 6,320,115 B1 | 11/2001 | Kataoka et al. |
| 6,336,304 B1 | 1/2002 | Mimura et al. |
| 6,341,454 B1 | 1/2002 | Koleoglou |
| 6,407,329 B1 | 6/2002 | Iino et al. |
| 6,576,830 B2 | 6/2003 | Nagao et al. |
| 6,928,781 B2 | 8/2005 | Desbois et al. |
| 6,972,367 B2 | 12/2005 | Federspiel et al. |
| 7,138,578 B2 | 11/2006 | Komamine |
| 7,155,870 B2 | 1/2007 | Almy |
| 7,178,295 B2 | 2/2007 | Dinwoodie |
| 7,487,771 B1 | 2/2009 | Eiffert et al. |
| 7,587,864 B2 | 9/2009 | McCaskill et al. |
| 7,678,990 B2 | 3/2010 | McCaskill et al. |
| 7,678,991 B2 | 3/2010 | McCaskill et al. |
| 7,748,191 B2 | 7/2010 | Podirsky |
| 7,819,114 B2 | 10/2010 | Augenbraun et al. |
| 7,824,191 B1 | 11/2010 | Podirsky |
| 7,832,176 B2 | 11/2010 | McCaskill et al. |
| 8,118,109 B1 | 2/2012 | Hacker |
| 8,168,880 B2 | 5/2012 | Jacobs et al. |
| 8,173,889 B2 | 5/2012 | Kalkanoglu et al. |
| 8,210,570 B1 | 7/2012 | Railkar et al. |
| 8,276,329 B2 | 10/2012 | Lenox |
| 8,312,693 B2 | 11/2012 | Cappelli |
| 8,319,093 B2 | 11/2012 | Kalkanoglu et al. |
| 8,333,040 B2 | 12/2012 | Shiao et al. |
| 8,371,076 B2 | 2/2013 | Jones et al. |
| 8,375,653 B2 | 2/2013 | Shiao et al. |
| 8,404,967 B2 | 3/2013 | Kalkanoglu et al. |
| 8,410,349 B2 | 4/2013 | Kalkanoglu et al. |
| 8,418,415 B2 | 4/2013 | Shiao et al. |
| 8,438,796 B2 | 5/2013 | Shiao et al. |
| 8,468,754 B2 | 6/2013 | Railkar et al. |
| 8,468,757 B2 | 6/2013 | Krause et al. |
| 8,505,249 B2 | 8/2013 | Geary |
| 8,512,866 B2 | 8/2013 | Taylor |
| 8,513,517 B2 | 8/2013 | Kalkanoglu et al. |
| 8,586,856 B2 | 11/2013 | Kalkanoglu et al. |
| 8,601,754 B2 | 12/2013 | Jenkins et al. |
| 8,629,578 B2 | 1/2014 | Kurs et al. |
| 8,646,228 B2 | 2/2014 | Jenkins |
| 8,656,657 B2 | 2/2014 | Livsey et al. |
| 8,671,630 B2 | 3/2014 | Lena et al. |
| 8,677,702 B2 | 3/2014 | Jenkins |
| 8,695,289 B2 | 4/2014 | Koch et al. |
| 8,713,858 B1 | 5/2014 | Xie |
| 8,713,860 B2 | 5/2014 | Railkar et al. |
| 8,733,038 B2 | 5/2014 | Kalkanoglu et al. |
| 8,776,455 B2 | 7/2014 | Azoulay |
| 8,789,321 B2 | 7/2014 | Ishida |
| 8,793,940 B2 | 8/2014 | Kalkanoglu et al. |
| 8,793,941 B2 | 8/2014 | Bosler et al. |
| 8,826,607 B2 | 9/2014 | Shiao et al. |
| 8,835,751 B2 | 9/2014 | Kalkanoglu et al. |
| 8,863,451 B2 | 10/2014 | Jenkins et al. |
| 8,898,970 B2 | 12/2014 | Jenkins et al. |
| 8,925,262 B2 | 1/2015 | Railkar et al. |
| 8,943,766 B2 | 2/2015 | Gombarick et al. |
| 8,946,544 B2 | 2/2015 | Jabos et al. |
| 8,950,128 B2 | 2/2015 | Kalkanoglu et al. |
| 8,959,848 B2 | 2/2015 | Jenkins et al. |
| 8,966,838 B2 | 3/2015 | Jenkins |
| 8,966,850 B2 | 3/2015 | Jenkins et al. |
| 8,994,224 B2 | 3/2015 | Mehta et al. |
| 9,032,672 B2 | 5/2015 | Livsey et al. |
| 9,153,950 B2 | 10/2015 | Yamanaka et al. |
| 9,166,087 B2 | 10/2015 | Chihlas et al. |
| 9,169,646 B2 | 10/2015 | Rodrigues et al. |
| 9,170,034 B2 | 10/2015 | Bosler et al. |
| 9,178,465 B2 | 11/2015 | Shiao et al. |
| 9,202,955 B2 | 12/2015 | Livsey et al. |
| 9,212,832 B2 | 12/2015 | Jenkins |
| 9,217,584 B2 | 12/2015 | Kalkanoglu et al. |
| 9,270,221 B2 | 2/2016 | Zhao |
| 9,273,885 B2 | 3/2016 | Rordigues et al. |
| 9,276,141 B2 | 3/2016 | Kalkanoglu et al. |
| 9,331,224 B2 | 5/2016 | Koch et al. |
| 9,356,174 B2 | 5/2016 | Duarte et al. |
| 9,359,014 B1 | 6/2016 | Yang et al. |
| 9,412,890 B1 | 8/2016 | Meyers |
| 9,528,270 B2 | 12/2016 | Jenkins et al. |
| 9,605,432 B1 | 3/2017 | Robbins |
| 9,711,672 B2 | 7/2017 | Wang |
| 9,755,573 B2 | 9/2017 | Livsey et al. |
| 9,786,802 B2 | 10/2017 | Shiao et al. |
| 9,831,818 B2 | 11/2017 | West |
| 9,912,284 B2 | 3/2018 | Svec |
| 9,923,515 B2 | 3/2018 | Rodrigues et al. |
| 9,938,729 B2 | 4/2018 | Coon |
| 9,991,412 B2 | 6/2018 | Gonzalez et al. |
| 9,998,067 B2 | 6/2018 | Kalkanoglu et al. |
| 10,027,273 B2 | 7/2018 | West et al. |
| 10,115,850 B2 | 10/2018 | Rodrigues et al. |
| 10,128,660 B1 | 11/2018 | Apte et al. |
| 10,156,075 B1 | 12/2018 | McDonough |
| 10,187,005 B2 | 1/2019 | Rodrigues et al. |
| 10,256,765 B2 | 4/2019 | Rodrigues et al. |
| 10,284,136 B1 | 5/2019 | Mayfield et al. |
| 10,454,408 B2 | 10/2019 | Livsey et al. |
| 10,530,292 B1 | 1/2020 | Cropper et al. |
| 10,560,048 B2 | 2/2020 | Fisher et al. |
| 10,563,406 B2 | 2/2020 | Kalkanoglu et al. |
| D879,031 S | 3/2020 | Lance et al. |
| 10,579,028 B1 | 3/2020 | Jacob |
| 10,784,813 B2 | 9/2020 | Kalkanoglu et al. |
| D904,289 S | 12/2020 | Lance et al. |
| 11,012,026 B2 | 5/2021 | Kalkanoglu et al. |
| 11,177,639 B1 | 11/2021 | Nguyen et al. |
| 11,217,715 B2 | 1/2022 | Sharenko |
| 11,251,744 B1 * | 2/2022 | Bunea .................... H02S 20/25 |
| 11,258,399 B2 | 2/2022 | Kalkanoglu et al. |
| 11,283,394 B2 | 3/2022 | Perkins et al. |
| 11,309,828 B2 | 4/2022 | Sirski et al. |
| 11,394,344 B2 | 7/2022 | Perkins et al. |
| 11,424,379 B2 | 8/2022 | Sharenko et al. |
| 11,431,280 B2 | 8/2022 | Liu et al. |
| 11,431,281 B2 | 8/2022 | Perkins et al. |
| 11,444,569 B2 | 9/2022 | Clemente et al. |
| 11,454,027 B2 | 9/2022 | Kuiper et al. |
| 11,459,757 B2 | 10/2022 | Nguyen et al. |
| 11,486,144 B2 | 11/2022 | Bunea et al. |
| 11,489,482 B2 | 11/2022 | Peterson et al. |
| 11,496,088 B2 | 11/2022 | Sirski et al. |
| 11,508,861 B1 | 11/2022 | Perkins et al. |
| 11,512,480 B1 | 11/2022 | Achor et al. |
| 11,527,665 B2 | 12/2022 | Boitnott |
| 11,545,927 B2 | 1/2023 | Abra et al. |
| 11,545,928 B2 | 1/2023 | Perkins et al. |
| 11,658,470 B2 | 5/2023 | Nguyen et al. |
| 11,661,745 B2 | 5/2023 | Bunea et al. |
| 11,689,149 B2 | 6/2023 | Clemente et al. |
| 11,705,531 B2 | 7/2023 | Sharenko et al. |
| 11,728,759 B2 | 8/2023 | Nguyen et al. |
| 11,732,490 B2 | 8/2023 | Achor et al. |
| 11,811,361 B1 | 11/2023 | Farhangi et al. |
| 11,824,486 B2 | 11/2023 | Nguyen et al. |
| 11,824,487 B2 | 11/2023 | Nguyen et al. |
| 11,843,067 B2 | 12/2023 | Nguyen et al. |
| 2002/0053360 A1 | 5/2002 | Kinoshita et al. |
| 2002/0078991 A1 * | 6/2002 | Nagao .................... H02S 40/38 |
| | | 136/251 |
| 2002/0129849 A1 | 9/2002 | Heckeroth |
| 2003/0101662 A1 | 6/2003 | Ullman |
| 2003/0132265 A1 | 7/2003 | Villela et al. |
| 2003/0217768 A1 | 11/2003 | Guha |

(56) References Cited

U.S. PATENT DOCUMENTS

| | | |
|---|---|---|
| 2004/0000334 A1 | 1/2004 | Ressler |
| 2005/0030187 A1 | 2/2005 | Peress et al. |
| 2005/0115603 A1 | 6/2005 | Yoshida et al. |
| 2005/0144870 A1 | 7/2005 | Dinwoodie |
| 2005/0178428 A1 | 8/2005 | Laaly et al. |
| 2005/0193673 A1 | 9/2005 | Rodrigues et al. |
| 2006/0042683 A1 | 3/2006 | Gangemi |
| 2006/0046084 A1 | 3/2006 | Yang et al. |
| 2007/0074757 A1 | 4/2007 | Mellott et al. |
| 2007/0181174 A1 | 8/2007 | Ressler |
| 2007/0193618 A1 | 8/2007 | Bressler et al. |
| 2007/0249194 A1 | 10/2007 | Liao |
| 2007/0295385 A1 | 12/2007 | Sheats et al. |
| 2008/0006323 A1 | 1/2008 | Kalkanoglu et al. |
| 2008/0035140 A1 | 2/2008 | Placer et al. |
| 2008/0078440 A1 | 4/2008 | Lim et al. |
| 2008/0185748 A1 | 8/2008 | Kalkanoglu |
| 2008/0271774 A1 | 11/2008 | Kalkanoglu et al. |
| 2008/0302030 A1 | 12/2008 | Stancel et al. |
| 2008/0315061 A1 | 12/2008 | Fath |
| 2009/0000222 A1 | 1/2009 | Kalkanoglu et al. |
| 2009/0014057 A1 | 1/2009 | Croft et al. |
| 2009/0014058 A1 | 1/2009 | Croft et al. |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu et al. |
| 2009/0178350 A1 | 7/2009 | Kalkanoglu et al. |
| 2009/0229652 A1 | 9/2009 | Mapel et al. |
| 2009/0275247 A1 | 11/2009 | Richter et al. |
| 2010/0019580 A1 | 1/2010 | Croft et al. |
| 2010/0095618 A1 | 4/2010 | Edison et al. |
| 2010/0101634 A1 | 4/2010 | Frank et al. |
| 2010/0116325 A1 | 5/2010 | Nikoonahad |
| 2010/0131108 A1 | 5/2010 | Meyer |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0170169 A1 | 7/2010 | Railkar et al. |
| 2010/0186798 A1 | 7/2010 | Tormen et al. |
| 2010/0242381 A1 | 9/2010 | Jenkins |
| 2010/0313499 A1 | 12/2010 | Gangemi |
| 2010/0325976 A1 | 12/2010 | DeGenfelder et al. |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1* | 3/2011 | Livsey .................. H02S 20/23 52/173.3 |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0165441 A1* | 7/2011 | Genies .................. H02S 40/38 320/101 |
| 2011/0168238 A1 | 7/2011 | Metin et al. |
| 2011/0239555 A1 | 10/2011 | Cook et al. |
| 2011/0302859 A1 | 12/2011 | Crasnianski |
| 2011/0314753 A1 | 12/2011 | Farmer et al. |
| 2012/0034799 A1 | 2/2012 | Hunt |
| 2012/0060434 A1 | 3/2012 | Jacobs |
| 2012/0060902 A1 | 3/2012 | Drake |
| 2012/0085392 A1 | 4/2012 | Albert et al. |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0260977 A1 | 10/2012 | Stancel |
| 2012/0266942 A1 | 10/2012 | Komatsu et al. |
| 2012/0279150 A1 | 11/2012 | Pislkak et al. |
| 2012/0282437 A1 | 11/2012 | Clark et al. |
| 2012/0291848 A1 | 11/2012 | Sherman et al. |
| 2013/0008499 A1 | 1/2013 | Verger et al. |
| 2013/0014455 A1 | 1/2013 | Grieco |
| 2013/0118558 A1 | 5/2013 | Sherman |
| 2013/0193769 A1 | 8/2013 | Mehta et al. |
| 2013/0247988 A1 | 9/2013 | Reese et al. |
| 2013/0284267 A1 | 10/2013 | Plug et al. |
| 2013/0306137 A1 | 11/2013 | Ko |
| 2014/0041713 A1* | 2/2014 | Adler ..................... H05B 3/26 136/251 |
| 2014/0090696 A1* | 4/2014 | Rodrigues ............. H02S 40/32 136/251 |
| 2014/0090697 A1 | 4/2014 | Rodrigues et al. |
| 2014/0150843 A1 | 6/2014 | Pearce et al. |
| 2014/0173997 A1 | 6/2014 | Jenkins |
| 2014/0179220 A1 | 6/2014 | Railkar et al. |
| 2014/0182222 A1 | 7/2014 | Kalkanoglu et al. |
| 2014/0208675 A1 | 7/2014 | Beerer et al. |
| 2014/0254776 A1 | 9/2014 | O'Connor et al. |
| 2014/0260001 A1* | 9/2014 | Kiik ...................... H02S 20/25 52/173.3 |
| 2014/0266289 A1 | 9/2014 | Della Sera et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0089895 A1 | 4/2015 | Leitch |
| 2015/0162459 A1 | 6/2015 | Lu et al. |
| 2015/0340516 A1 | 11/2015 | Kim et al. |
| 2015/0349173 A1 | 12/2015 | Morad et al. |
| 2016/0105144 A1 | 4/2016 | Haynes et al. |
| 2016/0142008 A1 | 5/2016 | Lopez et al. |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0159292 A1 | 6/2017 | Chihlas et al. |
| 2017/0179319 A1 | 6/2017 | Yamashita et al. |
| 2017/0179726 A1 | 6/2017 | Garrity et al. |
| 2017/0201098 A1* | 7/2017 | Carpenter ............. H02J 3/381 |
| 2017/0237390 A1 | 8/2017 | Hudson et al. |
| 2017/0331415 A1 | 11/2017 | Koppi et al. |
| 2018/0094438 A1 | 4/2018 | Wu et al. |
| 2018/0097472 A1 | 4/2018 | Anderson et al. |
| 2018/0115275 A1 | 4/2018 | Flanigan et al. |
| 2018/0254738 A1 | 9/2018 | Yang et al. |
| 2018/0294765 A1 | 10/2018 | Friedrich et al. |
| 2018/0351502 A1 | 12/2018 | Almy et al. |
| 2018/0367089 A1 | 12/2018 | Stutterheim et al. |
| 2019/0030867 A1 | 1/2019 | Sun et al. |
| 2019/0081436 A1 | 3/2019 | Onodi et al. |
| 2019/0123679 A1 | 4/2019 | Rodrigues et al. |
| 2019/0253022 A1 | 8/2019 | Hardar et al. |
| 2019/0305717 A1 | 10/2019 | Allen et al. |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0083619 A1 | 3/2021 | Hegedus |
| 2021/0115223 A1 | 4/2021 | Bonekamp et al. |
| 2021/0159353 A1 | 5/2021 | Li et al. |
| 2021/0301536 A1 | 9/2021 | Baggs et al. |
| 2021/0343886 A1 | 11/2021 | Sharenko et al. |
| 2022/0149213 A1 | 5/2022 | Mensink et al. |

FOREIGN PATENT DOCUMENTS

| | | |
|---|---|---|
| CN | 202797032 U | 3/2013 |
| CN | 217150978 U | 8/2022 |
| DE | 1958248 A1 | 11/1971 |
| EP | 1039361 A1 | 9/2000 |
| EP | 1837162 A1 | 9/2007 |
| EP | 1774372 A1 | 7/2011 |
| EP | 2446481 A2 | 5/2012 |
| EP | 2784241 A1 | 10/2014 |
| EP | 3772175 A1 | 2/2021 |
| JP | 10046767 A | 2/1998 |
| JP | 2002-106151 A | 4/2002 |
| JP | 2001-098703 A | 10/2002 |
| JP | 2017-027735 A | 2/2017 |

(56) References Cited

FOREIGN PATENT DOCUMENTS

| | | | |
|---|---|---|---|
| JP | 2018053707 | A | 4/2018 |
| KR | 20090084060 | A | 8/2009 |
| KR | 10-1348283 | B1 | 1/2014 |
| KR | 10-2019-0000367 | A | 1/2019 |
| KR | 10-2253483 | B1 | 5/2021 |
| NL | 2026856 | B1 | 6/2022 |
| WO | 2010/151777 | A2 | 12/2010 |
| WO | 2011/049944 | A1 | 4/2011 |
| WO | 2015/133632 | A1 | 9/2015 |
| WO | 2018/000589 | A1 | 1/2018 |
| WO | 2019/201416 | A1 | 10/2019 |
| WO | 2020-159358 | A1 | 8/2020 |
| WO | 2021-247098 | A1 | 12/2021 |

OTHER PUBLICATIONS

RGS Energy, 3.5KW Powerhouse 3.0 system installed in an afternoon; Jun. 7, 2019 <<facebook.com/RGSEnergy/>> retrieved Feb. 2, 2021.
Tesla, Solar Roof <<tesla.com/solarroof>> retrieved Feb. 2, 2021.
"Types of Roofing Underlayment", Owens Corning Roofing; <<https://www.owenscorning.com/en-us/roofing/tools/how-roofing-underlayment-helps-protect-your-home>> retrieved Nov. 1, 2021.

\* cited by examiner

PHOTOVOLTAIC MODULES WITH ENERGY STORAGE COMPONENTS

CROSS-REFERENCE TO RELATED APPLICATION

This application is a Section 111(a) application relating to and claiming the benefit of commonly-owned, U.S. Provisional Patent Application Ser. No. 63/487,450, filed Feb. 28, 2023, entitled "PHOTOVOLTAIC MODULES WITH ENERGY STORAGE COMPONENTS;" and U.S. Provisional Patent Application Ser. No. 63/580,871, filed Sep. 6, 2023, entitled "PHOTOVOLTAIC MODULES WITH ENERGY STORAGE COMPONENTS;" the contents of each of which are incorporated herein by reference in its entirety.

FIELD OF THE INVENTION

The present invention relates to photovoltaic systems and, more particularly, photovoltaic modules with energy storage components.

BACKGROUND

Photovoltaic systems are installed on building roofs to generate electricity.

SUMMARY

In some embodiments, a system includes a plurality of photovoltaic modules installed on a roof deck, wherein each of the photovoltaic modules includes at least one solar cell, an encapsulant encapsulating the at least one solar cell, wherein the encapsulant includes a first surface and a second surface opposite the first surface, a frontsheet juxtaposed with the first surface of the encapsulant, a backsheet juxtaposed with the second surface of the encapsulant, a headlap portion, wherein the photovoltaic module is installed on the roof deck by at least one fastener through the headlap portion, and an energy storage device between the roof deck and the backsheet, wherein the energy storage device is in electrical communication with the at least one solar cell.

In some embodiments, the energy storage device comprises a battery. In some embodiments, the energy storage device comprises a capacitor. In some embodiments, each of the photovoltaic modules includes an electronics assembly electrically communicating the at least one solar cell with the energy storage device. In some embodiments, the electronics assembly is on a lower surface of the backsheet. In some embodiments, the electronics assembly is on an upper surface of the backsheet. In some embodiments, each of the photovoltaic modules includes a side lap, wherein the side lap includes an upper surface, and wherein the electronics assembly is on the upper surface of the side lap. In some embodiments, the energy storage device is on a lower surface of the backsheet. In some embodiments, the electronics assembly comprises a controller configured to control at least one of charging of the energy storage device and discharging of the energy storage device. In some embodiments, the energy storage device has a thickness of 0.2 mm to 10 mm. In some embodiments, the at least one fastener includes a plurality of fasteners. In some embodiments, the plurality of fasteners includes one or more of nails, rivets, staples and screws. In some embodiments, the headlap portion includes a nail zone, and wherein the plurality of fasteners is installed through the nail zone. In some embodiments, the energy storage device is disposed outside of the nail zone. In some embodiments, each of the plurality of photovoltaic modules does not include a frame.

In some embodiments, a photovoltaic module includes at least one solar cell; an encapsulant encapsulating the at least one solar cell, wherein the encapsulant includes a first surface and a second surface opposite the first surface; a frontsheet juxtaposed with the first surface of the encapsulant; a backsheet juxtaposed with the second surface of the encapsulant; a headlap portion; wherein the photovoltaic module is configured to be installed on a roof deck by at least one fastener through the headlap portion; and an energy storage device, wherein the energy storage device is below the backsheet, and wherein the energy storage device is in electrical communication with the at least one solar cell.

In some embodiments, the energy storage device comprises a battery. In some embodiments, the energy storage device comprises a capacitor. In some embodiments, the energy storage device is attached to a bottom surface of the backsheet. In some embodiments, the photovoltaic module includes an electronics assembly electrically communicating the at least one solar cell with the energy storage device. In some embodiments, the electronics assembly is on a bottom surface of the backsheet. In some embodiments, the electronics assembly is on a top surface of the backsheet. In some embodiments, the headlap portion includes a nail zone, and wherein the photovoltaic module is configured to receive the at least one fastener through the nail zone. In some embodiments, the energy storage device is disposed outside of the nail zone. In some embodiments, the photovoltaic module does not include a frame.

In some embodiments, a method comprises the steps of: obtaining a plurality of photovoltaic modules, wherein each of the photovoltaic modules includes at least one solar cell, an encapsulant encapsulating the at least one solar cell, wherein the encapsulant includes a first surface and a second surface opposite the first surface, a frontsheet juxtaposed with the first surface of the encapsulant, a backsheet juxtaposed with the second surface of the encapsulant, and a headlap portion, and an energy storage device, wherein the energy storage device is located below the backsheet, wherein the energy storage device is in electrical communication with the at least one solar cell; and installing the photovoltaic modules on a roof deck, wherein each of the photovoltaic modules is installed on the roof deck with at least one fastener through the headlap portion, and wherein the energy storage device is between the roof deck and the backsheet.

BRIEF DESCRIPTION OF THE DRAWINGS

This section refers to the drawings that form a part of this disclosure, and which illustrate some of the embodiments of structure, materials, and/or methods of the present invention described herein.

DETAILED DESCRIPTION

In addition to the benefits and improvements that the Specification discloses, other objects and advantages of that the Specification provides will become apparent from the following description taken in conjunction with the accompanying figures. Although the description discloses and describes detailed embodiments of the present disclosure, the disclosed embodiments are merely illustrative of the disclosure that may be embodied in various forms. In addition, each of the examples given regarding the various embodiments of the disclosure are intended to be illustrative, and not restrictive.

Throughout the specification and claims, the following terms take the meanings explicitly associated herein, unless the context clearly dictates otherwise. The phrases "in an embodiment," "in some embodiments," and any similar phrase, as used herein, do not necessarily refer to the same embodiment or embodiments, though the phrases may refer to the same embodiment or embodiments. Furthermore, the phrases "in another embodiment," and any similar phrase, as used herein, do not necessarily refer to a different embodiment, although the phrases may refer to a different embodiment. All embodiments of the disclosure are intended to be combinable without departing from the scope or spirit of the disclosure.

As used herein, terms such as "comprising," "including," "having," and any similar phrase, do not limit the scope of a specific claim to the materials or steps recited by the claim.

Figure 1:
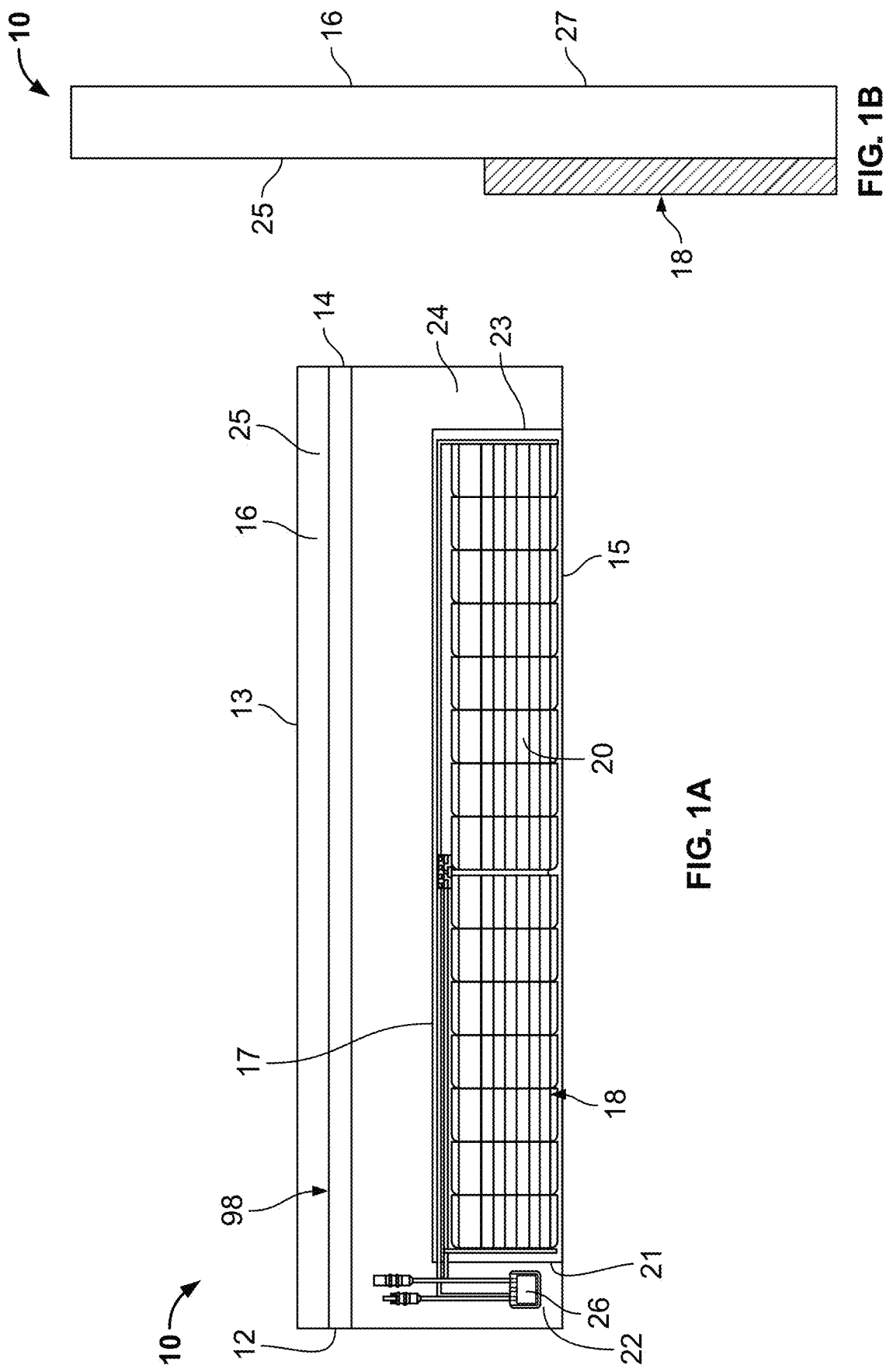
FIGS. 1A and 1B are a top plan view and a side elevational view, respectively, of some embodiments of a photovoltaic module.

Referring to FIGS. 1A and 1B, in some embodiments, a photovoltaic module 10 includes a first end 12, a second end 14 opposite the first end 12, a first edge 13 extending from the first end 12 to the second end 14, and a second edge 15 opposite the first edge 13 and extending from the first end 12 to the second end 14. In some embodiments, the photovoltaic module 10 includes a headlap portion 16. In some embodiments, the headlap portion 16 extends from the first end 12 to the second end 14 and from the first edge 13 to a first location 17 between the first edge 13 and the second edge 15. In some embodiments, the photovoltaic module 10 includes a reveal portion 18. In some embodiments, the reveal portion 18 includes at least one solar cell 20. In some embodiments, the photovoltaic module 10 includes a first side lap 22 located at the first end 12. In some embodiments, the first side lap 22 includes a length extending from the first end 12 to a second location 21 between the first end 12 and the second end 14. In some embodiments, the photovoltaic module 10 includes a second side lap 24 located at the second end 14. In some embodiments, the second side lap 24 includes a length extending from the second end 14 to a third location 23 between the first end 12 and the second end 14. In some embodiments, the photovoltaic module 10 includes an outer surface 25 and an inner surface 27 opposite the outer surface 25. In some embodiments, the reveal portion 18 extends from the first side lap 22 to the second side lap 24 and from the second edge 15 to the first location 17. In some embodiments, the photovoltaic module 10 is configured to be installed on a building structure. In some embodiments, at least one junction box 26 is located on the first side lap 22. In some embodiments, the at least one junction box 26 includes a plurality of the junction boxes 26. In some embodiments, the photovoltaic module 10 includes a structure, composition, components, and/or function similar to those of one or more embodiments of the photovoltaic modules disclosed in PCT International Patent Publication No. WO 2022/051593, Application No. PCT/US2021/049017, published Mar. 10, 2022, entitled "Building Integrated Photovoltaic System," owned by GAF Energy LLC, and U.S. Pat. No. 11,251,744 to Bunea et al., issued Feb. 15, 2022, entitled "Photovoltaic Shingles and Methods of Installing Same," the contents of each of which are incorporated by reference herein in their entirety.

In some embodiments, the at least one solar cell 20 includes a plurality of the solar cells 20. In some embodiments, the plurality of solar cells 20 includes two solar cells. In some embodiments, the plurality of solar cells 20 includes three solar cells. In some embodiments, the plurality of solar cells 20 includes four solar cells. In some embodiments, the plurality of solar cells 20 includes five solar cells. In some embodiments, the plurality of solar cells 20 includes six solar cells. In some embodiments, the plurality of solar cells 20 includes seven solar cells. In some embodiments, the plurality of solar cells 20 includes eight solar cells. In some embodiments, the plurality of solar cells 20 includes nine solar cells. In some embodiments, the plurality of solar cells 20 includes ten solar cells. In some embodiments, the plurality of solar cells 20 includes eleven solar cells. In some embodiments, the plurality of solar cells 20 includes twelve solar cells. In some embodiments, the plurality of solar cells 20 includes thirteen solar cells. In some embodiments, the plurality of solar cells 20 includes fourteen solar cells. In some embodiments, the plurality of solar cells 20 includes fifteen solar cells. In some embodiments, the plurality of solar cells 20 includes sixteen solar cells. In some embodiments, the plurality of solar cells 20 includes more than sixteen solar cells.

In some embodiments, the plurality of solar cells 20 is arranged in one row (i.e., one reveal). In another embodiment, the plurality of solar cells 20 is arranged in two rows (i.e., two reveals). In another embodiment, the plurality of solar cells 20 is arranged in three rows (i.e., three reveals). In another embodiment, the plurality of solar cells 20 is arranged in four rows (i.e., four reveals). In another embodiment, the plurality of solar cells 20 is arranged in five rows (i.e., five reveals). In another embodiment, the plurality of solar cells 20 is arranged in six rows (i.e., six reveals). In other embodiments, the plurality of solar cells 20 is arranged in more than six rows. In some embodiments, the at least one solar cell 20 is electrically inactive (i.e., a "dummy" solar cell).

Figure 2:
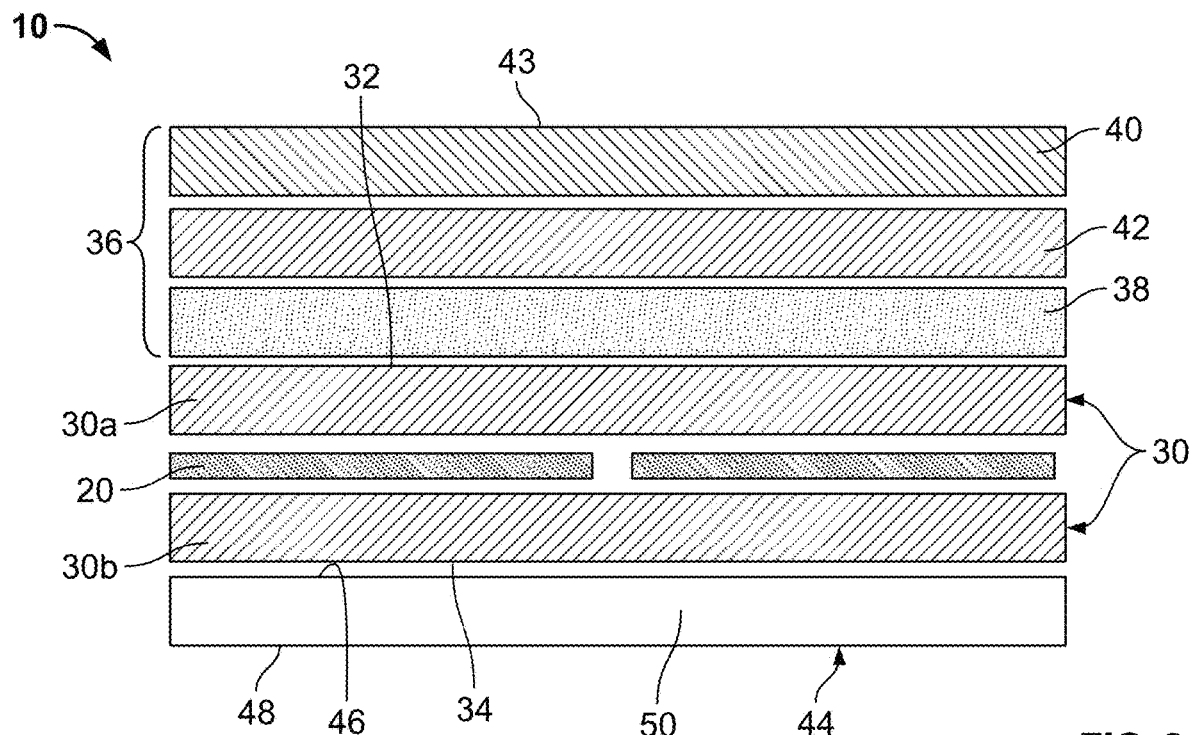
FIGS. 2 and 3 are schematic views of some embodiments of a photovoltaic module.
Figure 3:
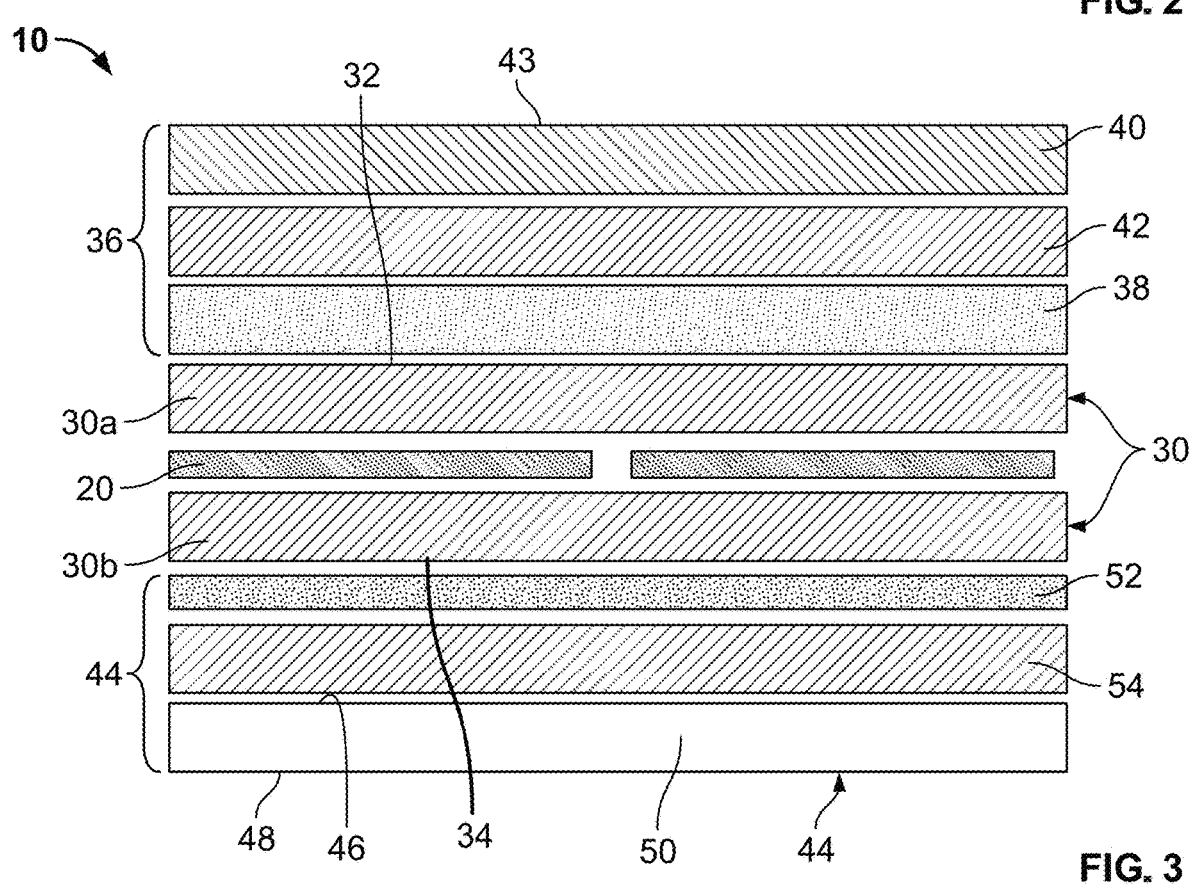

Referring to FIGS. 2 and 3, in some embodiments, the photovoltaic module 10 includes an encapsulant 30 encapsulating the at least one solar cell 20. In some embodiments, the encapsulant 30 includes a first layer 30a having a first surface 32 and a second layer 30b having a second surface 34 opposite the first surface 32. In some embodiments, the photovoltaic module 10 includes a frontsheet 36 juxtaposed with the first surface 32 of the first layer 30a of the encapsulant 30. In some embodiments, the frontsheet 36 includes a glass layer 38. In some embodiments, the frontsheet 36 includes a polymer layer 40 attached to the glass layer 38. In some embodiments, the polymer layer 40 forms an upper surface of the photovoltaic module 10. In some embodiments, the polymer layer 40 is attached to the glass layer 38 by a first adhesive layer 42. In some embodiments, an upper surface 43 of the polymer layer 40 is an upper surface of the photovoltaic module 10. In some embodiments, the upper surface 43 of the polymer layer 40 is textured. In some embodiments, the upper surface 43 of the polymer layer 40 is embossed. In some embodiments, the upper surface 43 of the polymer layer 40 is embossed with a plurality of indentations. In some embodiments, the upper surface 43 of the polymer layer 40 includes a pattern. In some embodiments, the upper surface 43 of the polymer layer 40 includes a printed pattern. In some embodiments, the upper surface 43 of the polymer layer 40 includes an embossed pattern. In some embodiments, the upper surface 43 of the polymer layer 40 includes a textured pattern.

In some embodiments, the photovoltaic module 10 includes a backsheet 44. In some embodiments, the backsheet 44 is juxtaposed with the second surface 34 of the second layer 30b of the encapsulant 30. In some embodiments, the backsheet 44 includes a first surface (top surface) 46 and a second surface (bottom surface) 48 opposite the first surface 46 of the backsheet 44. In some embodiments, the second surface 48 of the backsheet 44 forms a lower surface of the photovoltaic module 10. In some embodiments, the backsheet 44 includes a first layer 50. In some embodiments, the backsheet 44 includes a second layer 52 (see FIG. 3). In some embodiments, the second layer 52 is attached to the first layer 50 by a second adhesive layer 54. In some embodiments, the backsheet 44 includes only one layer (see FIG. 2). In some embodiments, the backsheet 44 includes only the first layer 50 (see FIG. 2). In some embodiments, the backsheet 44 does not include the second layer 52 (see FIG. 2). In some embodiments, the backsheet 44 is composed of a polymer. In some embodiments, the backsheet 44 is composed of thermoplastic polyolefin (TPO). In some embodiments, the backsheet 44 forms the headlap portion 16.

In some embodiments, each of the encapsulant 30, the frontsheet 36, including each of the glass layer 38, the polymer layer 40, and the first adhesive layer 42, and the backsheet 44, including the first layer 50, the second layer 52, and the second adhesive layer 54 of the photovoltaic module 10, as applicable, includes a structure, composition and/or function of similar to those of more or one of the embodiments of the corresponding components disclosed in PCT International Patent Publication No. WO 2022/051593, Application No. PCT/US2021/049017, published Mar. 10, 2022, entitled Building Integrated Photovoltaic System, owned by GAF Energy LLC, and U.S. Pat. No. 11,251,744 to Bunea et al., issued Feb. 15, 2022, entitled "Photovoltaic Shingles and Methods of Installing Same," the contents of each of which are incorporated by reference herein in their entirety.

Figure 4:
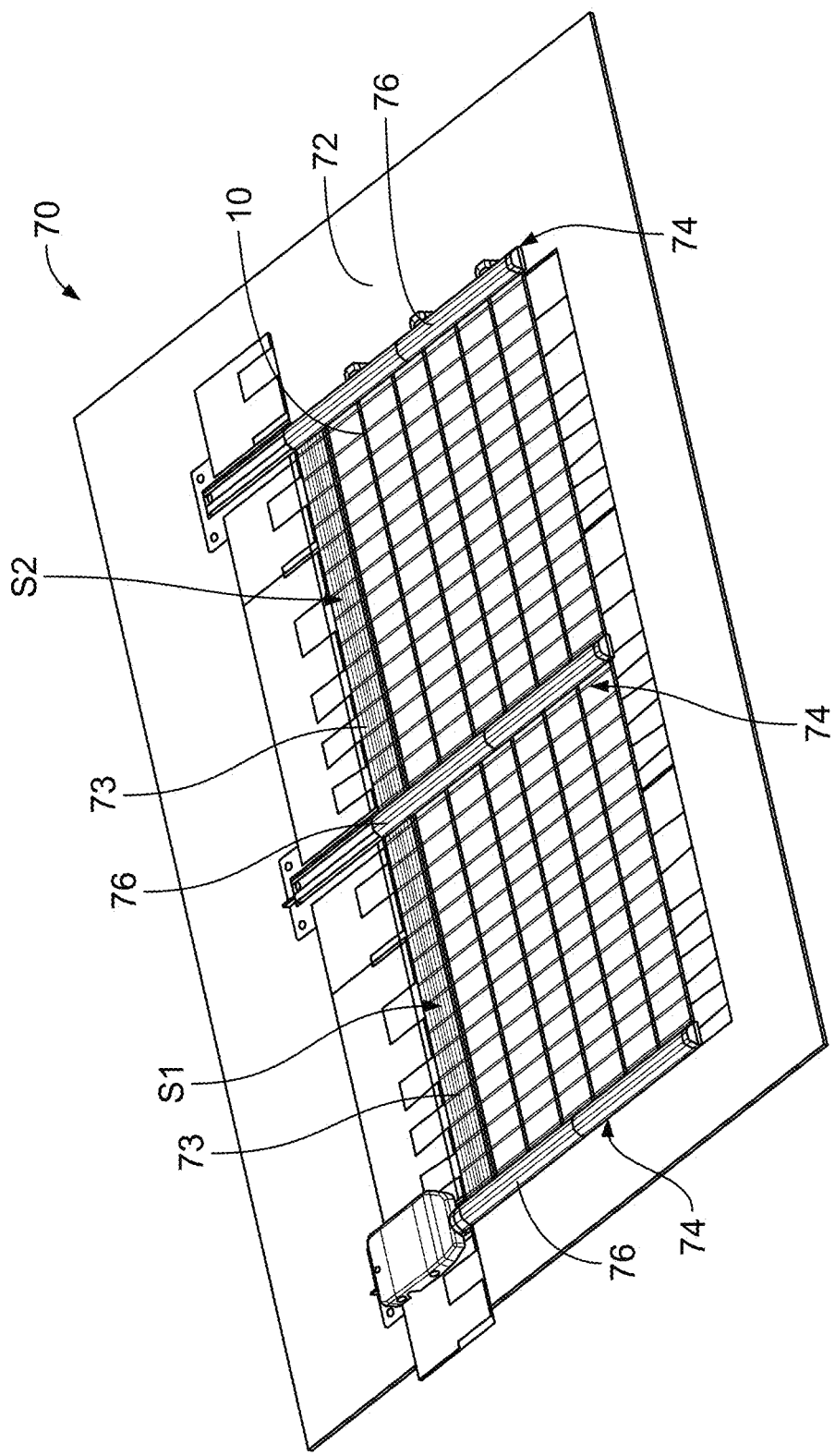
FIG. 4 is a top perspective view of some embodiments of a photovoltaic system.

Referring to FIG. 4, in some embodiments, a system 70 includes a plurality of the photovoltaic modules 10 installed on a roof deck 72. In some embodiments, the plurality of the photovoltaic modules 10 is arranged in an array on the roof deck 72. In some embodiments, the array of the photovoltaic modules 10 includes subarrays S1, S2. In certain embodiments, the array includes more than the two subarrays S1, S2. In some embodiments, the array includes a single array S1. In some embodiments, each of the subarrays S1, S2 include a plurality of rows of the photovoltaic modules 10.

In some embodiments, the reveal portion 18 of one of the photovoltaic modules 10 in the subarray S1 overlays the head lap portion 16 of an adjacent another one of the photovoltaic modules 10 of the subarray S1. In some embodiments, at least a portion of the first side lap 22 of the one of the photovoltaic modules 10 overlays at least a portion of the first side lap 22 of the another one of the photovoltaic modules 10. In some embodiments, at least a portion of the second side lap 24 of the one of the photovoltaic modules 10 overlays at least a portion of the second side lap 24 of the another one of the photovoltaic modules 10.

In some embodiments, the first side lap 22 of one of the photovoltaic modules 10 in the subarray S2 overlays the second side lap 24 of an adjacent another one of the photovoltaic modules 10 in the subarray S1 in the same one of the rows R. In some embodiments, a jumper module 73 overlays an uppermost one of the photovoltaic modules 10 in a column of the subarray S1. In some embodiments, the active portion of the jumper module 73 overlays the head lap portion 16 of the photovoltaic module 10.

In some embodiments, the roof deck 72 is a steep slope roof deck. As defined herein, a "steep slope roof deck" is any roof deck that is disposed on a roof having a pitch of Y/X, where Y and X are in a ratio of 4:12 to 20:12, where Y corresponds to the "rise" of the roof, and where X corresponds to the "run" of the roof.

In some embodiments, the plurality of photovoltaic modules 10 is installed directly to the roof deck 72. In some embodiments, the plurality of photovoltaic modules 10 is installed above an underlayment layer installed on the roof deck 72. In some embodiments, the plurality of photovoltaic modules 10 is installed on an underlayment layer installed on the roof deck 72. In some embodiments, each of the plurality of photovoltaic modules 10 is installed on the roof deck 72 by a plurality of fasteners 96 (see FIG. 6). In some embodiments, the plurality of fasteners 96 is installed through the headlap portion 16. In some embodiments, the plurality of fasteners 96 includes a plurality of nails. In some embodiments, the plurality of fasteners 96 includes a plurality of rivets. In some embodiments, the plurality of fasteners 96 includes a plurality of screws. In some embodiments, the plurality of fasteners 96 includes a plurality of staples.

In some embodiments, each of the plurality of photovoltaic modules 10 does not include a frame. In some embodiments, each of the plurality of photovoltaic modules 10 does not include a frame on or around a periphery thereof. In some embodiments, as used herein, the term "frame" means a solar panel frame configured to be installed on one or more side, or all sides, of a periphery of a solar module to seal and fix solar module components thereof, and, in some embodiments, is composed of a metal, such as aluminum or extruded aluminum, or a polymer.

In some embodiments, each of the plurality of photovoltaic modules 10 is installed on the roof deck 72 by an adhesive. In some embodiments, the adhesive is adhered directly to the roof deck 72. In some embodiments, the adhesive is adhered to an underlayment. In some embodiments, the underlayment is adhered directly to the roof deck 72. In some embodiments, the adhesive is located on a rear surface of the photovoltaic module 10. In some embodiments, the adhesive includes at least one adhesive strip. In some embodiments, the adhesive includes a plurality of adhesive strips. In some embodiments, the plurality of adhesive strips is arranged intermittently. In some embodiments, the adhesive is located proximate to at least one edge of the photovoltaic module 10, including the first edge 13 and the second edge 15. In some embodiments, the adhesive is a peel and stick film sheet. In some embodiments, the peel and stick film sheet includes at least one sheet of film removably attached to the inner surface 27. In some embodiments, the peel and stick film sheet is composed of EverGuard Freedom HW peel and stick membrane manufactured by GAF. In some embodiments, the adhesive includes polyvinyl butyrate, acrylic, silicone, or polycarbonate. In some embodiments, the adhesive includes pressure sensitive adhesives.

In some embodiments, the system 70 includes at least one wireway 74 installed proximate to the first ends 12 of the photovoltaic modules 10. In some embodiments, the at least one wireway 74 is installed proximate to the second end 14 of the photovoltaic modules 10. In some embodiments, the at least one wireway 74 is installed intermediate the first end 12 of one of the photovoltaic modules 10 and a second end 14 of another one of the photovoltaic modules 10. In some embodiments, the at least one wireway 74 includes a lid 76. In some embodiments, the lid 76 is removably attached to the at least one wireway 74. In some embodiments, the at least one wireway 74 includes a plurality of the wireways 74. In some embodiments, one of the lids 76 of one of the plurality of wireways 74 overlaps another of the lids 76 of another of the plurality of wireways 74. In some embodiments, the at least one wireway 74 includes a height of 1 mm to 20 mm. In some embodiments, the at least one wireway 74 includes a single wireway installed proximate to the first end of each of the photovoltaic modules 10. In some embodiments, the at least one wireway 74 does not include any electrical components or electrical wires or cables therein. In some embodiments, the at least one wireway 74 and the lids 76 include a structure, composition and/or function of similar to those of more or one of the embodiments of the wireways and lids disclosed in PCT International Patent Publication No. WO 2022/051593, Application No. PCT/US2021/049017, published Mar. 10, 2022, entitled Building Integrated Photovoltaic System, owned by GAF Energy LLC, and U.S. Pat. No. 11,251,744 to Bunea et al., issued Feb. 15, 2022, entitled "Photovoltaic Shingles and Methods of Installing Same," the contents of each of which are incorporated by reference herein in their entirety. In some embodiments, the at least one wireway 74 and the lids 76 include a structure, composition and/or function of similar to those of more or one of the embodiments of the wireways and wire covers disclosed in attached Appendix A.

Figure 5:
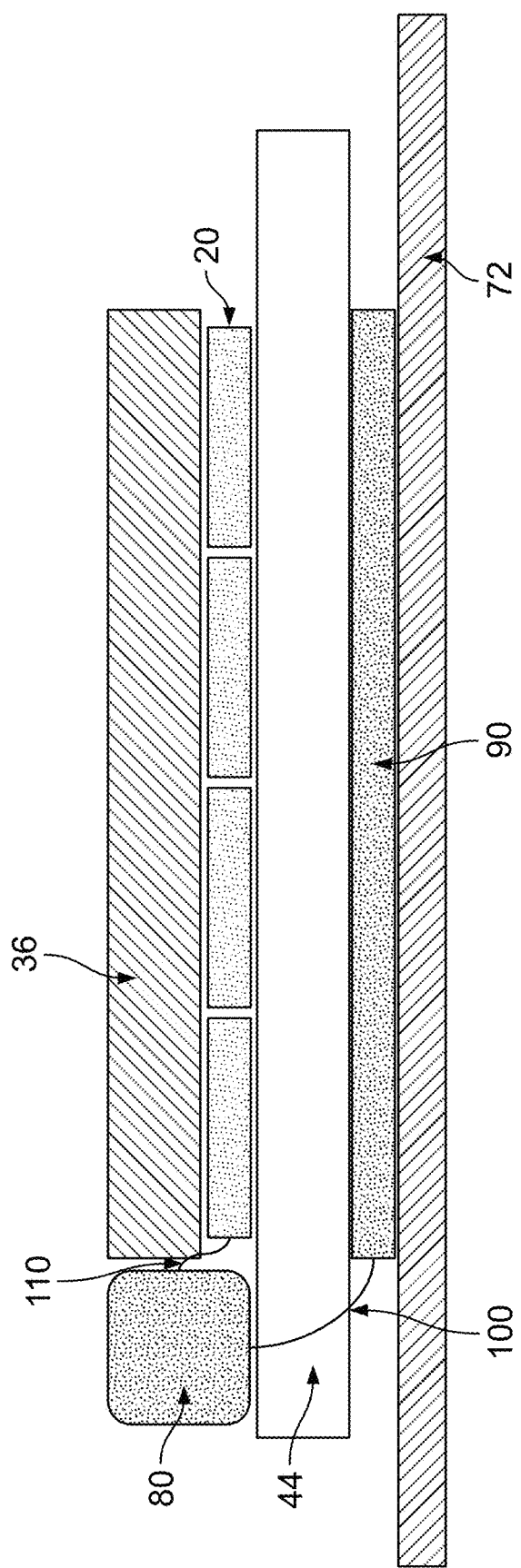
FIG. 5 is a cross-sectional schematic view of some embodiments of a photovoltaic module.

FIG. 5 is a schematic cross-sectional view of the photovoltaic module 10 including an electronics assembly 80 and an energy storage device 90, in accordance with some embodiments of the invention, and as described herein. FIG. 5 shows a representation of the photovoltaic module 10 described above. As shown in the figure, and as discussed, in some embodiments, the photovoltaic module 10 includes the frontsheet 36, one or more of the solar cells 20, and the backsheet 44. In some embodiments, the photovoltaic module 10 includes the electronics assembly 80 and/or the energy storage device 90. As shown in the figure, and as further described, in some embodiments of the invention, the energy storage device 90 is underneath the backsheet 44. In some embodiments, the energy storage device 90 is attached to the second surface (bottom or lower surface) 48 of the backsheet 44. Also as shown in the figure, and as further described, one or more components of the electronics assembly 80 are above the backsheet 44. In some embodiments, one or more components of the electronics assembly 80 are attached to the first surface (top or upper surface) 46 of the backsheet 44. In some embodiments of the invention, one or more components of the electronics assembly 80 are connected to the first side lap 22 and/or the second side lap 24 of the first surface 46. In some embodiments, as shown in the figure, wiring 100 electrically connects the electronics assembly 80 with the energy storage device 90, and wiring 110 electrically connects the electronics assembly 80 with one or more of the solar cells 20. In some embodiments, the electronics assembly 80 is installed within the at least one wireway 74. In some embodiments, the lid 76 overlays the electronics assembly 80.

Figure 6:
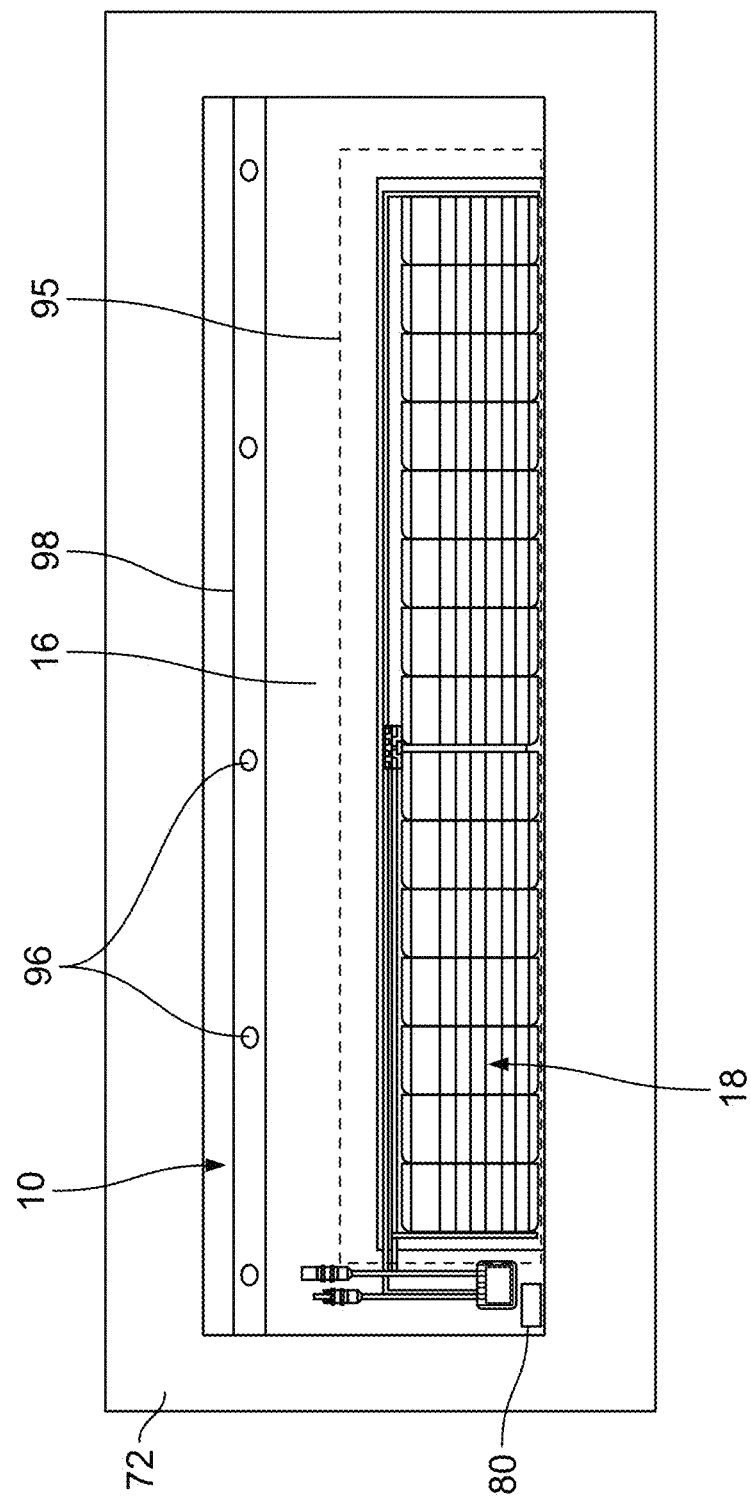
FIG. 6 is a schematic view of some embodiments of a photovoltaic module installed on a roof deck.

Referring to FIG. 6, in some embodiments, the electronics assembly 80 and/or the energy storage device 90 are disposed outside of a nail zone 98, such as when the photovoltaic module 10 is a nailable module (that is, a module that is installed on the roof deck 72 by one or more of the fasteners 96 such nails, screws, staples, and/or rivets). In some embodiments, the nail zone 98 is located in at least a portion of the headlap portion 16. In some embodiments, the electronics assembly 80 is installed on the backsheet 44 outside the reveal portion 18 of the photovoltaic module 10. In some embodiments, the energy storage device 90 is installed on the backsheet 44 outside the reveal portion 18 of the photovoltaic module 10. In some embodiments, the energy storage device 90 is installed under the backsheet 44 and at least a portion of the reveal portion 18 of the photovoltaic module 10.

In some embodiments, when the electronics assembly 80 is installed on one of the side laps 22, 24 on the first surface 46 of the backsheet 44, and the energy storage device 90 is installed on the second surface 48 of the backsheet 44, the energy storage device 90 does not overlay or cover either of the side laps 22, 24.

In some embodiments, the energy storage device 90 may comprise at least one capacitor. In some embodiments, the at least one capacitor may comprise a single capacitor. In some embodiments, the at least one capacitor may comprise two capacitors. In some embodiments, the at least one capacitor may comprise three, four, five, six, seven, eight, nine, ten, or more than ten capacitors. In some embodiments, at least one of the capacitors may comprise a super capacitor.

In some embodiments, the energy storage device 90 may comprise at least one battery. In some embodiments, the at least one battery may comprise a single battery. In some embodiments, the at least one battery may comprise two batteries. In some embodiments, the at least one battery may comprise three, four, five, six, seven, eight, nine, ten, or more than ten batteries. In some embodiments, the at least one battery may comprise an electrochemical battery. In some embodiments, some or all the batteries may be wired in series to one or more other batteries. In some embodiments, some or all of the batteries may be wired in parallel to one or more other batteries. In some embodiments, some of the batteries are wired in series to one or more other batteries, and some of the batteries are wired in parallel to one or more other batteries.

In some embodiments, at least one of the batteries may be a lead-acid battery. In some embodiments, at least one of the batteries may be a nickel-cadmium (NiCd) battery. In some embodiments, at least one of the batteries may be a nickel-metal (NiMH) hydride battery. In some embodiments, at least one of the batteries may be a lithium-ion (Li-ion) battery. In some embodiments, at least one of the batteries may be a zinc-ion (ZIB) battery. In some embodiments, at least one of the batteries may be a zinc-air battery. In some embodiments, at least one of the batteries may be a lithium iron phosphate (LFP) battery.

In some embodiments, the energy storage device 90 may be one or more batteries and one or more capacitors.

In some embodiments, the energy storage device 90, such at least one battery and/or at least one capacitor, may be used in place of an external battery, such as a battery disposed in a garage, storage room, or in some other place in a residential, commercial, or industrial building on which the system 70 is installed, and which otherwise stores power generated by the photovoltaic modules 10 of the system 70. In some embodiments, the electronics assembly 80 may be in electrical communication with one or more external batteries, external capacitors, and/or other external energy storage devices—that is, the system 70 may include the energy storage devices 90 of the photovoltaic module 10 as well as one or more external energy storage devices.

In some embodiments, the energy storage device 90 may be configured to be charged with energy produced by one or more of the solar cells 20 of the photovoltaic module 10. In some embodiments, the energy storage device 90 may be configured to be charged with energy produced by one or more of the solar cells 20 of another one of the photovoltaic modules 10 of the system 70, such as through an electrical connection between or among photovoltaic modules 10 of the system 70.

In some embodiments, the electronics assembly 80 may comprise a controller. In some embodiments, the controller may be configured to provide an electrical connection between one or more of the solar cells 20 of the photovoltaic module 10 and the energy storage device 90. In some embodiments, the controller may be configured to control storage of energy produced by one or more of the solar cells 20 of the photovoltaic module 10 in the energy storage device 90. In some embodiments, the controller may be configured to control either or both of charging and/or discharging of the energy storage device 90. In some embodiments, the controller may be configured to control either or both of charging and/or discharging of the energy storage device 90 to regulate the life of the energy storage device 90. In some embodiments, the controller may be configured to control either or both of charging and/or discharging of the energy storage device 90 to regulate energy output. In some embodiments, the electronics assembly 80 may omit a controller.

In some embodiments, whether the electronics assembly 80 does or does not include a controller, the electronics assembly 80 may be in electrical communication with an external controller that is not a part of the electronics assembly 80. In some embodiments, the energy storage device 90 may be in wireless, wired, and/or powerline communication with the external controller, directly or through another component, such as the electronics assembly 80. In some embodiments, the external controller may control charging and/or discharging of the energy storage devices 90 of one or more, or all, of the photovoltaic modules 10 of the system 70, independent of each other. In some embodiments, the external controller may smooth out the generation curve throughout the day, by providing power stored in the energy storage devices 90 when the photovoltaic modules 10 of the system 70 are producing less power. In some embodiments, the external controller may provide power from the energy storage devices 90 of the system 70 at a time or times when energy demand of the electrical system within the structure on which the system 70 is installed increases. In some embodiments, the external controller may provide power from the energy storage devices 90 of the system 70 based on the price of electricity.

In some embodiments, one or more, or all, of the components of the electronics assembly 80 may be underneath the solar cells 20 of the photovoltaic module 10. In some embodiments, one or more, or all, of the components of the electronics assembly 80 may be above the backsheet 44 of the photovoltaic module 10. In some embodiments, one or more, or all, of the components of the electronics assembly 80 may be above the backsheet 44 on either or both of the first side lap 22 and/or the second side lap 24 of the photovoltaic module 10. In some embodiments, when the photovoltaic module 10 includes other electronics, such as the junction box 26 on one of the side laps 22, 24, one or more, or all, of the components of the electronics assembly 80 may be on the other of the side laps 22, 24 of the photovoltaic module 10. In some embodiments, one or more, or all, of the components of the electronics assembly 80 may be underneath the backsheet 44 of the photovoltaic module 10. In some embodiments, one or more, or all, of the components of the electronics assembly 80 may be between the roof deck 72 on which the system 70 is installed, and the photovoltaic module 10. In some embodiments, one or more, or all, of the components of the electronics assembly 80 may be attached to the first surface 46 and/or the second surface 48 of the backsheet 44. In some embodiments, one or more, or all, of the components of the electronics assembly 80 may be attached to the backsheet 44 by one or more mechanical fasteners. In some embodiments, one or more, or all, of the components of the electronics assembly 80 may be attached to the backsheet 44 by thermal bonding. In some embodiments, one or more, or all, of the components of the electronics assembly 80 may be attached to the backsheet 44 by one or more adhesives. In some embodiments, one or more, or all, of the components of the electronics assembly 80 may be attached to the backsheet 44 by welding. In some embodiments, one or more, or all, of the components of the electronics assembly 80 may be attached to the backsheet 44 by heat welding. In some embodiments, one or more, or all, of the components of the electronics assembly 80 may be attached to the backsheet 44 by ultrasonic welding. In some embodiments, one or more, or all, of the components of the electronics assembly 80 may be attached to the backsheet 44 by combinations of one or more mechanical fasteners, thermal bonding, one or more adhesives, welding, heat welding, and/or ultrasonic welding.

Figure 7:
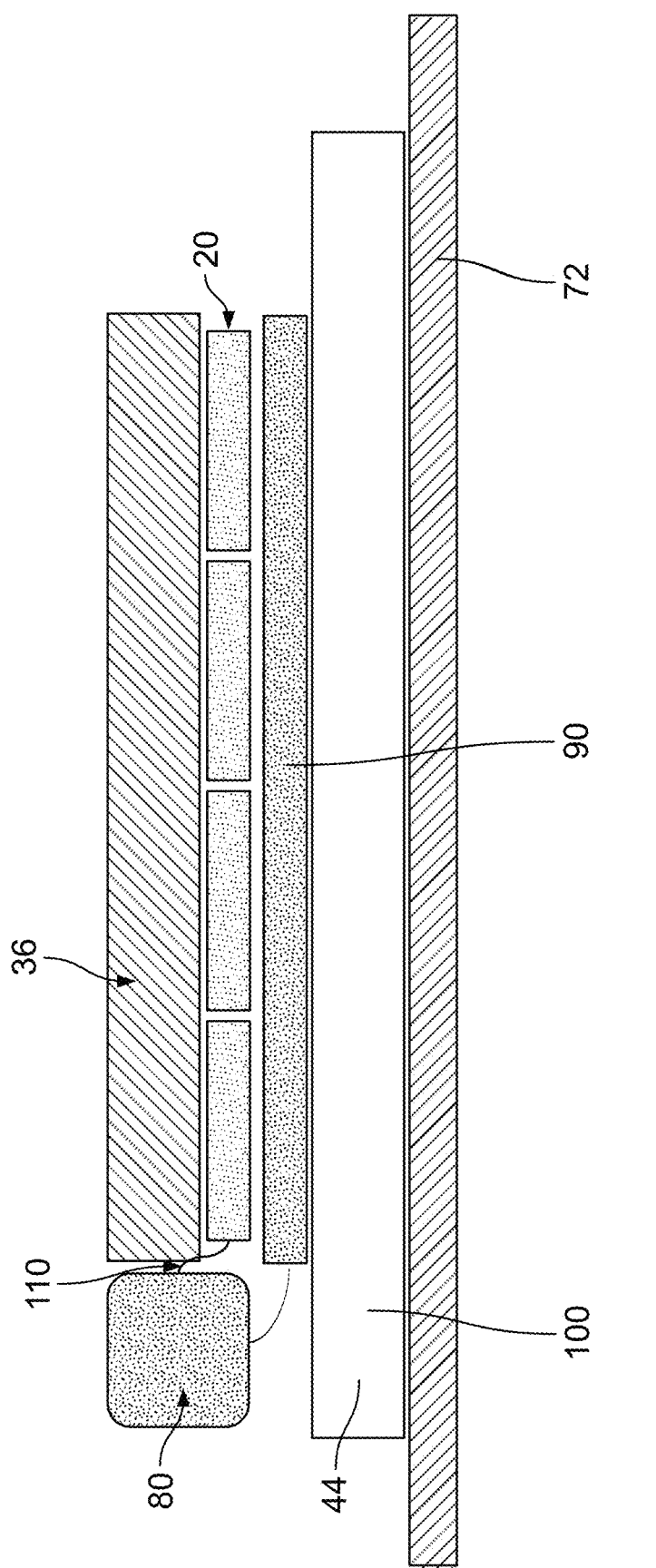
FIG. 7 is a cross-sectional schematic view of some embodiments of a photovoltaic module.

Referring to FIG. 7, in some embodiments, the energy storage device 90 may be underneath the solar cells 20 of the photovoltaic module 10. In some embodiments, as illustrated in FIG. 7, the energy storage device 90 may be above the backsheet 44 of the photovoltaic module 10. In some embodiments, the energy storage device 90 may be above the backsheet 44 on either or both of the first side lap 22 and/or the second side lap 24 of the photovoltaic module 10. In some embodiments, the energy storage device 90 may be underneath the backsheet 44 of the photovoltaic module 10. In some embodiments, the energy storage device 90 may be between the roof deck 72 on which the system 70 is installed, and the photovoltaic module 10. In some embodiments, the energy storage device 90 may be attached to the first surface 46 and/or the second surface 48 of the backsheet 44. In some embodiments, the energy storage device 90 may be attached to the backsheet 44 by one or more mechanical fasteners. In some embodiments, the energy storage device 90 may be attached to the backsheet 44 by thermal bonding. In some embodiments, the energy storage device 90 may be attached to the backsheet 44 by one or more adhesives. In some embodiments, the energy storage device 90 may be attached to the backsheet 44 by welding. In some embodiments, the energy storage device 90 may be attached to the backsheet 44 by heat welding. In some embodiments, the energy storage device 90 may be attached to the backsheet 44 by ultrasonic welding. In some embodiments, the energy storage device 90 may be attached to the backsheet 44 by combinations of one or more mechanical fasteners, thermal bonding, one or more adhesives, welding, heat welding, and/or ultrasonic welding.

In some embodiments, when the energy storage device 90 includes at least one battery, the battery may be thin. In some embodiments, the battery may have a thickness of less than 0.2 mm. In some embodiments, the battery may have a thickness of less than 0.3 mm. In some embodiments, the battery may have a thickness of less than 0.4 mm. In some embodiments, the battery may have a thickness of less than 0.5 mm. In some embodiments, the battery may have a thickness of less than 0.6 mm. In some embodiments, the battery may have a thickness of less than 0.7 mm. In some embodiments, the battery may have a thickness of less than 0.8 mm. In some embodiments, the battery may have a thickness of less than 0.9 mm. In some embodiments, the battery may have a thickness of less than 1 mm. In some embodiments, the battery may have a thickness of less than 2 mm. In some embodiments, the battery may have a thickness of less than 3 mm. In some embodiments, the battery may have a thickness of less than 4 mm. In some embodiments, the battery may have a thickness of less than 5 mm. In some embodiments, the battery may have a thickness of less than 6 mm. In some embodiments, the battery may have a thickness of less than 7 mm. In some embodiments, the battery may have a thickness of less than 8 mm. In some embodiments, the battery may have a thickness of less than 9 mm. In some embodiments, the battery may have a thickness of less than 10 mm.

In some embodiments, the battery may have a thickness of 0.2 mm. In some embodiments, the battery may have a thickness of 0.3 mm. In some embodiments, the battery may have a thickness of 0.4 mm. In some embodiments, the battery may have a thickness of 0.5 mm. In some embodiments, the battery may have a thickness of 0.6 mm. In some embodiments, the battery may have a thickness of 0.7 mm. In some embodiments, the battery may have a thickness of 0.8 mm. In some embodiments, the battery may have a thickness of 0.9 mm. In some embodiments, the battery may have a thickness of 1 mm. In some embodiments, the battery may have a thickness of 2 mm. In some embodiments, the battery may have a thickness of 3 mm. In some embodiments, the battery may have a thickness of 4 mm. In some embodiments, the battery may have a thickness of 5 mm. In some embodiments, the battery may have a thickness of 6 mm. In some embodiments, the battery may have a thickness of 7 mm. In some embodiments, the battery may have a thickness of 8 mm. In some embodiments, the battery may have a thickness of 9 mm. In some embodiments, the battery may have a thickness of 10 mm.

In some embodiments, the battery may have a thickness of greater than 0.2 mm. In some embodiments, the battery may have a thickness of greater than 0.3 mm. In some embodiments, the battery may have a thickness of greater than 0.4 mm. In some embodiments, the battery may have a thickness of greater than 0.5 mm. In some embodiments, the battery may have a thickness of greater than 0.6 mm. In some embodiments, the battery may have a thickness of greater than 0.7 mm. In some embodiments, the battery may have a thickness of greater than 0.8 mm. In some embodiments, the battery may have a thickness of greater than 0.9 mm. In some embodiments, the battery may have a thickness of greater than 1 mm. In some embodiments, the battery may have a thickness of greater than 2 mm. In some embodiments, the battery may have a thickness of greater than 3 mm. In some embodiments, the battery may have a thickness of greater than 4 mm. In some embodiments, the battery may have a thickness of greater than 5 mm. In some embodiments, the battery may have a thickness of greater than 6 mm. In some embodiments, the battery may have a thickness of greater than 7 mm. In some embodiments, the battery may have a thickness of greater than 8 mm. In some embodiments, the battery may have a thickness of greater than 9 mm. In some embodiments, the battery may have a thickness of greater than 10 mm.

In some embodiments, the battery may have a thickness of from 0.2 mm to 10 mm. In some embodiments, the battery may have a thickness of from 0.3 mm to 10 mm. In some embodiments, the battery may have a thickness of from 0.4 mm to 10 mm. In some embodiments, the battery may have a thickness of from 0.5 mm to 10 mm. In some embodiments, the battery may have a thickness of from 0.6 mm to 10 mm. In some embodiments, the battery may have a thickness of from 0.7 mm to 10 mm. In some embodiments, the battery may have a thickness of from 0.8 mm to 10 mm. In some embodiments, the battery may have a thickness of from 0.9 mm to 10 mm. In some embodiments, the battery may have a thickness of from 1 mm to 10 mm. In some embodiments, the battery may have a thickness of from 2 mm to 10 mm. In some embodiments, the battery may have a thickness of from 3 mm to 10 mm. In some embodiments, the battery may have a thickness of from 4 mm to 10 mm. In some embodiments, the battery may have a thickness of from 5 mm to 10 mm. In some embodiments, the battery may have a thickness of from 6 mm to 10 mm. In some embodiments, the battery may have a thickness of from 7 mm to 10 mm. In some embodiments, the battery may have a thickness of from 8 mm to 10 mm. In some embodiments, the battery may have a thickness of from 9 mm to 10 mm.

In some embodiments, the battery may have a thickness of from 0.2 mm to 9 mm. In some embodiments, the battery may have a thickness of from 0.3 mm to 9 mm. In some embodiments, the battery may have a thickness of from 0.4 mm to 9 mm. In some embodiments, the battery may have a thickness of from 0.5 mm to 9 mm. In some embodiments, the battery may have a thickness of from 0.6 mm to 9 mm. In some embodiments, the battery may have a thickness of from 0.7 mm to 9 mm. In some embodiments, the battery may have a thickness of from 0.8 mm to 9 mm. In some embodiments, the battery may have a thickness of from 0.9 mm to 9 mm. In some embodiments, the battery may have a thickness of from 1 mm to 9 mm. In some embodiments, the battery may have a thickness of from 2 mm to 9 mm. In some embodiments, the battery may have a thickness of from 3 mm to 9 mm. In some embodiments, the battery may have a thickness of from 4 mm to 9 mm. In some embodiments, the battery may have a thickness of from 5 mm to 9 mm. In some embodiments, the battery may have a thickness of from 6 mm to 9 mm. In some embodiments, the battery may have a thickness of from 7 mm to 9 mm. In some embodiments, the battery may have a thickness of from 8 mm to 9 mm.

In some embodiments, the battery may have a thickness of from 0.2 mm to 8 mm. In some embodiments, the battery may have a thickness of from 0.3 mm to 8 mm. In some embodiments, the battery may have a thickness of from 0.4 mm to 8 mm. In some embodiments, the battery may have a thickness of from 0.5 mm to 8 mm. In some embodiments, the battery may have a thickness of from 0.6 mm to 8 mm. In some embodiments, the battery may have a thickness of from 0.7 mm to 8 mm. In some embodiments, the battery may have a thickness of from 0.8 mm to 8 mm. In some embodiments, the battery may have a thickness of from 0.9 mm to 8 mm. In some embodiments, the battery may have a thickness of from 1 mm to 8 mm. In some embodiments, the battery may have a thickness of from 2 mm to 8 mm. In some embodiments, the battery may have a thickness of from 3 mm to 8 mm. In some embodiments, the battery may have a thickness of from 4 mm to 8 mm. In some embodiments, the battery may have a thickness of from 5 mm to 8 mm. In some embodiments, the battery may have a thickness of from 6 mm to 8 mm. In some embodiments, the battery may have a thickness of from 7 mm to 8 mm.

In some embodiments, the battery may have a thickness of from 0.2 mm to 7 mm. In some embodiments, the battery may have a thickness of from 0.3 mm to 7 mm. In some embodiments, the battery may have a thickness of from 0.4 mm to 7 mm. In some embodiments, the battery may have a thickness of from 0.5 mm to 7 mm. In some embodiments, the battery may have a thickness of from 0.6 mm to 7 mm. In some embodiments, the battery may have a thickness of from 0.7 mm to 7 mm. In some embodiments, the battery may have a thickness of from 0.8 mm to 7 mm. In some embodiments, the battery may have a thickness of from 0.9 mm to 7 mm. In some embodiments, the battery may have a thickness of from 1 mm to 7 mm. In some embodiments, the battery may have a thickness of from 2 mm to 7 mm. In some embodiments, the battery may have a thickness of from 3 mm to 7 mm. In some embodiments, the battery may have a thickness of from 4 mm to 7 mm. In some embodiments, the battery may have a thickness of from 5 mm to 7 mm. In some embodiments, the battery may have a thickness of from 6 mm to 7 mm.

In some embodiments, the battery may have a thickness of from 0.2 mm to 6 mm. In some embodiments, the battery may have a thickness of from 0.3 mm to 6 mm. In some embodiments, the battery may have a thickness of from 0.4 mm to 6 mm. In some embodiments, the battery may have a thickness of from 0.5 mm to 6 mm. In some embodiments, the battery may have a thickness of from 0.6 mm to 6 mm. In some embodiments, the battery may have a thickness of from 0.7 mm to 6 mm. In some embodiments, the battery may have a thickness of from 0.8 mm to 6 mm. In some embodiments, the battery may have a thickness of from 0.9 mm to 6 mm. In some embodiments, the battery may have a thickness of from 1 mm to 6 mm. In some embodiments, the battery may have a thickness of from 2 mm to 6 mm. In some embodiments, the battery may have a thickness of from 3 mm to 6 mm. In some embodiments, the battery may have a thickness of from 4 mm to 6 mm. In some embodiments, the battery may have a thickness of from 5 mm to 6 mm.

In some embodiments, the battery may have a thickness of from 0.2 mm to 5 mm. In some embodiments, the battery may have a thickness of from 0.3 mm to 5 mm. In some embodiments, the battery may have a thickness of from 0.4 mm to 5 mm. In some embodiments, the battery may have a thickness of from 0.5 mm to 5 mm. In some embodiments, the battery may have a thickness of from 0.6 mm to 5 mm. In some embodiments, the battery may have a thickness of from 0.7 mm to 5 mm. In some embodiments, the battery may have a thickness of from 0.8 mm to 5 mm. In some embodiments, the battery may have a thickness of from 0.9 mm to 5 mm. In some embodiments, the battery may have a thickness of from 1 mm to 5 mm. In some embodiments, the battery may have a thickness of from 2 mm to 5 mm. In some embodiments, the battery may have a thickness of from 3 mm to 5 mm. In some embodiments, the battery may have a thickness of from 4 mm to 5 mm.

In some embodiments, the battery may have a thickness of from 0.2 mm to 4 mm. In some embodiments, the battery may have a thickness of from 0.3 mm to 4 mm. In some embodiments, the battery may have a thickness of from 0.4 mm to 4 mm. In some embodiments, the battery may have a thickness of from 0.5 mm to 4 mm. In some embodiments, the battery may have a thickness of from 0.6 mm to 4 mm. In some embodiments, the battery may have a thickness of from 0.7 mm to 4 mm. In some embodiments, the battery may have a thickness of from 0.8 mm to 4 mm. In some embodiments, the battery may have a thickness of from 0.9 mm to 4 mm. In some embodiments, the battery may have a thickness of from 1 mm to 4 mm. In some embodiments, the battery may have a thickness of from 2 mm to 4 mm. In some embodiments, the battery may have a thickness of from 3 mm to 4 mm.

In some embodiments, the battery may have a thickness of from 0.2 mm to 3 mm. In some embodiments, the battery may have a thickness of from 0.3 mm to 3 mm. In some embodiments, the battery may have a thickness of from 0.4 mm to 3 mm. In some embodiments, the battery may have a thickness of from 0.5 mm to 3 mm. In some embodiments, the battery may have a thickness of from 0.6 mm to 3 mm. In some embodiments, the battery may have a thickness of from 0.7 mm to 3 mm. In some embodiments, the battery may have a thickness of from 0.8 mm to 3 mm. In some embodiments, the battery may have a thickness of from 0.9 mm to 3 mm. In some embodiments, the battery may have a thickness of from 1 mm to 3 mm. In some embodiments, the battery may have a thickness of from 2 mm to 3 mm.

In some embodiments, the battery may have a thickness of from 0.2 mm to 2 mm. In some embodiments, the battery may have a thickness of from 0.3 mm to 2 mm. In some embodiments, the battery may have a thickness of from 0.4 mm to 2 mm. In some embodiments, the battery may have a thickness of from 0.5 mm to 2 mm. In some embodiments, the battery may have a thickness of from 0.6 mm to 2 mm. In some embodiments, the battery may have a thickness of from 0.7 mm to 2 mm. In some embodiments, the battery may have a thickness of from 0.8 mm to 2 mm. In some embodiments, the battery may have a thickness of from 0.9 mm to 2 mm. In some embodiments, the battery may have a thickness of from 1 mm to 2 mm.

In some embodiments, the battery may have a thickness of from 0.2 mm to 1 mm. In some embodiments, the battery may have a thickness of from 0.3 mm to 1 mm. In some embodiments, the battery may have a thickness of from 0.4 mm to 1 mm. In some embodiments, the battery may have a thickness of from 0.5 mm to 1 mm. In some embodiments, the battery may have a thickness of from 0.6 mm to 1 mm. In some embodiments, the battery may have a thickness of from 0.7 mm to 1 mm. In some embodiments, the battery may have a thickness of from 0.8 mm to 1 mm. In some embodiments, the battery may have a thickness of from 0.9 mm to 1 mm.

In some embodiments, the battery may have a thickness of from 0.2 mm to 0.9 mm. In some embodiments, the battery may have a thickness of from 0.3 mm to 0.9 mm. In some embodiments, the battery may have a thickness of from 0.4 mm to 0.9 mm. In some embodiments, the battery may have a thickness of from 0.5 mm to 0.9 mm. In some embodiments, the battery may have a thickness of from 0.6 mm to 0.9 mm. In some embodiments, the battery may have a thickness of from 0.7 mm to 0.9 mm. In some embodiments, the battery may have a thickness of from 0.8 mm to 0.9 mm.

In some embodiments, the battery may have a thickness of from 0.2 mm to 0.8 mm. In some embodiments, the battery may have a thickness of from 0.3 mm to 0.8 mm. In some embodiments, the battery may have a thickness of from 0.4 mm to 0.8 mm. In some embodiments, the battery may have a thickness of from 0.5 mm to 0.8 mm. In some embodiments, the battery may have a thickness of from 0.6 mm to 0.8 mm. In some embodiments, the battery may have a thickness of from 0.7 mm to 0.8 mm.

In some embodiments, the battery may have a thickness of from 0.2 mm to 0.7 mm. In some embodiments, the battery may have a thickness of from 0.3 mm to 0.7 mm. In some embodiments, the battery may have a thickness of from 0.4 mm to 0.7 mm. In some embodiments, the battery may have a thickness of from 0.5 mm to 0.7 mm. In some embodiments, the battery may have a thickness of from 0.6 mm to 0.7 mm.

In some embodiments, the battery may have a thickness of from 0.2 mm to 0.6 mm. In some embodiments, the battery may have a thickness of from 0.3 mm to 0.6 mm. In some embodiments, the battery may have a thickness of from 0.4 mm to 0.6 mm. In some embodiments, the battery may have a thickness of from 0.5 mm to 0.6 mm.

In some embodiments, the battery may have a thickness of from 0.2 mm to 0.5 mm. In some embodiments, the battery may have a thickness of from 0.3 mm to 0.5 mm. In some embodiments, the battery may have a thickness of from 0.4 mm to 0.5 mm.

In some embodiments, the battery may have a thickness of from 0.2 mm to 0.4 mm. In some embodiments, the battery may have a thickness of from 0.3 mm to 0.4 mm. In some embodiments, the battery may have a thickness of from 0.2 mm to 0.3 mm.

In some embodiments, the battery may be flat. In some embodiments, the battery may have a flat top surface. In some embodiments, the battery may have a flat bottom surface. In some embodiments, the battery may have flat top and bottom surfaces.

In some embodiments, the electronics assembly 80 may include an inverter. In some embodiments, the inverter may convert DC power produced by the solar cells 20 and/or stored in the energy storage device 90 into AC power that is delivered to the electrical system of the building on which the system 70 is installed.

In some embodiments, the electronics assembly 80 may comprise a DC optimizer. In some embodiments, the DC optimizer may regulate an amount of power produced by the solar cells 20, and/or an amount of power provided to the energy storage device 90.

In some embodiments, the electronics assembly 80 is in electrical communication with an electrical system of the residential, commercial, or industrial building on which the system 70 is installed, such that the power stored in the battery may be used by one or more systems within the building.

In some embodiments, the energy storage device 90 may be connected directly in parallel with one or more of the solar cells 20. In that case, energy storage device 90 may be sized to an appropriate voltage to charge and discharge at or near the maximum power point voltage (Vmp) of the photovoltaic module 10.

In some embodiments, the energy storage device 90 may charge in the morning, and discharging stored energy as light intensity drops because of, e.g., passing clouds and/or reduced sunlight, and energy may be output from the energy storage device 90 to normalize energy output by the system 70 throughout the day.

In some embodiments, the energy storage device 90 may have a capacity of 50 Wh. In some embodiments, the energy storage device 90 may have a capacity of 55 Wh. In some embodiments, the energy storage device 90 may have a capacity of 60 Wh. In some embodiments, the energy storage device 90 may have a capacity of 65 Wh. In some embodiments, the energy storage device 90 may have a capacity of 70 Wh. In some embodiments, the energy storage device 90 may have a capacity of 75 Wh. In some embodiments, the energy storage device 90 may have a capacity of 80 Wh. In some embodiments, the energy storage device 90 may have a capacity of 85 Wh. In some embodiments, the energy storage device 90 may have a capacity of 90 Wh. In some embodiments, the energy storage device 90 may have a capacity of 95 Wh. In some embodiments, the energy storage device 90 may have a capacity of 100 Wh. In some embodiments, the energy storage device 90 may have a capacity of 110 Wh. In some embodiments, the energy storage device 90 may have a capacity of 120 Wh. In some embodiments, the energy storage device 90 may have a capacity of 130 Wh. In some embodiments, the energy storage device 90 may have a capacity of 140 Wh. In some embodiments, the energy storage device 90 may have a capacity of 150 Wh. In some embodiments, the energy storage device 90 may have a capacity of 160 Wh. In some embodiments, the energy storage device 90 may have a capacity of 170 Wh. In some embodiments, the energy storage device 90 may have a capacity of 180 Wh. In some embodiments, the energy storage device 90 may have a capacity of 190 Wh. In some embodiments, the energy storage device 90 may have a capacity of 200 Wh.

In some embodiments, the energy storage device 90 may have a capacity of greater than 50 Wh. In some embodiments, the energy storage device 90 may have a capacity of greater than 55 Wh. In some embodiments, the energy storage device 90 may have a capacity of greater than 60 Wh. In some embodiments, the energy storage device 90 may have a capacity of greater than 65 Wh. In some embodiments, the energy storage device 90 may have a capacity of greater than 70 Wh. In some embodiments, the energy storage device 90 may have a capacity of greater than 75 Wh. In some embodiments, the energy storage device 90 may have a capacity of greater than 80 Wh. In some embodiments, the energy storage device 90 may have a capacity of greater than 85 Wh. In some embodiments, the energy storage device 90 may have a capacity of greater than 90 Wh. In some embodiments, the energy storage device 90 may have a capacity of greater than 95 Wh. In some embodiments, the energy storage device 90 may have a capacity of greater than 100 Wh. In some embodiments, the energy storage device 90 may have a capacity of greater than 110 Wh. In some embodiments, the energy storage device 90 may have a capacity of greater than 120 Wh. In some embodiments, the energy storage device 90 may have a capacity of greater than 130 Wh. In some embodiments, the energy storage device 90 may have a capacity of greater than 140 Wh. In some embodiments, the energy storage device 90 may have a capacity of greater than 150 Wh. In some embodiments, the energy storage device 90 may have a capacity of greater than 160 Wh. In some embodiments, the energy storage device 90 may have a capacity of greater than 170 Wh. In some embodiments, the energy storage device 90 may have a capacity of greater than 180 Wh. In some embodiments, the energy storage device 90 may have a capacity of greater than 190 Wh. In some embodiments, the energy storage device 90 may have a capacity of greater than 200 Wh.

In some embodiments, the energy storage device 90 may have a capacity of less than 50 Wh. In some embodiments, the energy storage device 90 may have a capacity of less than 55 Wh. In some embodiments, the energy storage device 90 may have a capacity of less than 60 Wh. In some embodiments, the energy storage device 90 may have a capacity of less than 65 Wh. In some embodiments, the energy storage device 90 may have a capacity of less than 70 Wh. In some embodiments, the energy storage device 90 may have a capacity of less than 75 Wh. In some embodiments, the energy storage device 90 may have a capacity of less than 80 Wh. In some embodiments, the energy storage device 90 may have a capacity of less than 85 Wh. In some embodiments, the energy storage device 90 may have a capacity of less than 90 Wh. In some embodiments, the energy storage device 90 may have a capacity of less than 95 Wh. In some embodiments, the energy storage device 90 may have a capacity of less than 100 Wh. In some embodiments, the energy storage device 90 may have a capacity of less than 110 Wh. In some embodiments, the energy storage device 90 may have a capacity of less than 120 Wh. In some embodiments, the energy storage device 90 may have a capacity of less than 130 Wh. In some embodiments, the energy storage device 90 may have a capacity of less than 140 Wh. In some embodiments, the energy storage device 90 may have a capacity of less than 150 Wh. In some embodiments, the energy storage device 90 may have a capacity of less than 160 Wh. In some embodiments, the energy storage device 90 may have a capacity of less than 170 Wh. In some embodiments, the energy storage device 90 may have a capacity of less than 180 Wh. In some embodiments, the energy storage device 90 may have a capacity of less than 190 Wh. In some embodiments, the energy storage device 90 may have a capacity of less than 200 Wh.

In some embodiments, the energy storage device 90 may have a capacity of from 50 Wh to 200 Wh. In some embodiments, the energy storage device 90 may have a capacity of from 55 Wh to 200 Wh. In some embodiments, the energy storage device 90 may have a capacity of from 60 Wh to 200 Wh. In some embodiments, the energy storage device 90 may have a capacity of from 65 Wh to 200 Wh. In some embodiments, the energy storage device 90 may have a capacity of from 70 Wh to 200 Wh. In some embodiments, the energy storage device 90 may have a capacity of from 75 Wh to 200 Wh. In some embodiments, the energy storage device 90 may have a capacity of from 80 Wh to 200 Wh. In some embodiments, the energy storage device 90 may have a capacity of from 85 Wh to 200 Wh. In some embodiments, the energy storage device 90 may have a capacity of from 90 Wh to 200 Wh. In some embodiments, the energy storage device 90 may have a capacity of from 95 Wh to 200 Wh. In some embodiments, the energy storage device 90 may have a capacity of from 100 Wh to 200 Wh. In some embodiments, the energy storage device 90 may have a capacity of from 110 Wh to 200 Wh. In some embodiments, the energy storage device 90 may have a capacity of from 120 Wh to 200 Wh. In some embodiments, the energy storage device 90 may have a capacity of from 130 Wh to 200 Wh. In some embodiments, the energy storage device 90 may have a capacity of from 140 Wh to 200 Wh. In some embodiments, the energy storage device 90 may have a capacity of from 150 Wh to 200 Wh. In some embodiments, the energy storage device 90 may have a capacity of from 160 Wh to 200 Wh. In some embodiments, the energy storage device 90 may have a capacity of from 170 Wh to 200 Wh. In some embodiments, the energy storage device 90 may have a capacity of from 180 Wh to 200 Wh. In some embodiments, the energy storage device 90 may have a capacity of from 190 Wh to 200 Wh.

In some embodiments, the energy storage device 90 may have a capacity of from 50 Wh to 190 Wh. In some embodiments, the energy storage device 90 may have a capacity of from 55 Wh to 190 Wh. In some embodiments, the energy storage device 90 may have a capacity of from 60 Wh to 190 Wh. In some embodiments, the energy storage device 90 may have a capacity of from 65 Wh to 190 Wh. In some embodiments, the energy storage device 90 may have a capacity of from 70 Wh to 190 Wh. In some embodiments, the energy storage device 90 may have a capacity of from 75 Wh to 190 Wh. In some embodiments, the energy storage device 90 may have a capacity of from 80 Wh to 190 Wh. In some embodiments, the energy storage device 90 may have a capacity of from 85 Wh to 190 Wh. In some embodiments, the energy storage device 90 may have a capacity of from 90 Wh to 190 Wh. In some embodiments, the energy storage device 90 may have a capacity of from 95 Wh to 190 Wh. In some embodiments, the energy storage device 90 may have a capacity of from 100 Wh to 190 Wh. In some embodiments, the energy storage device 90 may have a capacity of from 110 Wh to 190 Wh. In some embodiments, the energy storage device 90 may have a capacity of from 120 Wh to 190 Wh. In some embodiments, the energy storage device 90 may have a capacity of from 130 Wh to 190 Wh. In some embodiments, the energy storage device 90 may have a capacity of from 140 Wh to 190 Wh. In some embodiments, the energy storage device 90 may have a capacity of from 150 Wh to 190 Wh. In some embodiments, the energy storage device 90 may have a capacity of from 160 Wh to 190 Wh. In some embodiments, the energy storage device 90 may have a capacity of from 170 Wh to 190 Wh. In some embodiments, the energy storage device 90 may have a capacity of from 180 Wh to 190 Wh.

In some embodiments, the energy storage device 90 may have a capacity of from 50 Wh to 180 Wh. In some embodiments, the energy storage device 90 may have a capacity of from 55 Wh to 180 Wh. In some embodiments, the energy storage device 90 may have a capacity of from 60 Wh to 180 Wh. In some embodiments, the energy storage device 90 may have a capacity of from 65 Wh to 180 Wh. In some embodiments, the energy storage device 90 may have a capacity of from 70 Wh to 180 Wh. In some embodiments, the energy storage device 90 may have a capacity of from 75 Wh to 180 Wh. In some embodiments, the energy storage device 90 may have a capacity of from 80 Wh to 180 Wh. In some embodiments, the energy storage device 90 may have a capacity of from 85 Wh to 180 Wh. In some embodiments, the energy storage device 90 may have a capacity of from 90 Wh to 180 Wh. In some embodiments, the energy storage device 90 may have a capacity of from 95 Wh to 180 Wh. In some embodiments, the energy storage device 90 may have a capacity of from 100 Wh to 180 Wh. In some embodiments, the energy storage device 90 may have a capacity of from 110 Wh to 180 Wh. In some embodiments, the energy storage device 90 may have a capacity of from 120 Wh to 180 Wh. In some embodiments, the energy storage device 90 may have a capacity of from 130 Wh to 180 Wh. In some embodiments, the energy storage device 90 may have a capacity of from 140 Wh to 180 Wh. In some embodiments, the energy storage device 90 may have a capacity of from 150 Wh to 180 Wh. In some embodiments, the energy storage device 90 may have a capacity of from 160 Wh to 180 Wh. In some embodiments, the energy storage device 90 may have a capacity of from 170 Wh to 180 Wh.

In some embodiments, the energy storage device 90 may have a capacity of from 50 Wh to 170 Wh. In some embodiments, the energy storage device 90 may have a capacity of from 55 Wh to 170 Wh. In some embodiments, the energy storage device 90 may have a capacity of from 60 Wh to 170 Wh. In some embodiments, the energy storage device 90 may have a capacity of from 65 Wh to 170 Wh. In some embodiments, the energy storage device 90 may have a capacity of from 70 Wh to 170 Wh. In some embodiments, the energy storage device 90 may have a capacity of from 75 Wh to 170 Wh. In some embodiments, the energy storage device 90 may have a capacity of from 80 Wh to 170 Wh. In some embodiments, the energy storage device 90 may have a capacity of from 85 Wh to 170 Wh. In some embodiments, the energy storage device 90 may have a capacity of from 90 Wh to 170 Wh. In some embodiments, the energy storage device 90 may have a capacity of from 95 Wh to 170 Wh. In some embodiments, the energy storage device 90 may have a capacity of from 100 Wh to 170 Wh. In some embodiments, the energy storage device 90 may have a capacity of from 110 Wh to 170 Wh. In some embodiments, the energy storage device 90 may have a capacity of from 120 Wh to 170 Wh. In some embodiments, the energy storage device 90 may have a capacity of from 130 Wh to 170 Wh. In some embodiments, the energy storage device 90 may have a capacity of from 140 Wh to 170 Wh. In some embodiments, the energy storage device 90 may have a capacity of from 150 Wh to 170 Wh. In some embodiments, the energy storage device 90 may have a capacity of from 160 Wh to 170 Wh.

In some embodiments, the energy storage device 90 may have a capacity of from 50 Wh to 160 Wh. In some embodiments, the energy storage device 90 may have a capacity of from 55 Wh to 160 Wh. In some embodiments, the energy storage device 90 may have a capacity of from 60 Wh to 160 Wh. In some embodiments, the energy storage device 90 may have a capacity of from 65 Wh to 160 Wh. In some embodiments, the energy storage device 90 may have a capacity of from 70 Wh to 160 Wh. In some embodiments, the energy storage device 90 may have a capacity of from 75 Wh to 160 Wh. In some embodiments, the energy storage device 90 may have a capacity of from 80 Wh to 160 Wh. In some embodiments, the energy storage device 90 may have a capacity of from 85 Wh to 160 Wh. In some embodiments, the energy storage device 90 may have a capacity of from 90 Wh to 160 Wh. In some embodiments, the energy storage device 90 may have a capacity of from 95 Wh to 160 Wh. In some embodiments, the energy storage device 90 may have a capacity of from 100 Wh to 160 Wh. In some embodiments, the energy storage device 90 may have a capacity of from 110 Wh to 160 Wh. In some embodiments, the energy storage device 90 may have a capacity of from 120 Wh to 160 Wh. In some embodiments, the energy storage device 90 may have a capacity of from 130 Wh to 160 Wh. In some embodiments, the energy storage device 90 may have a capacity of from 140 Wh to 160 Wh. In some embodiments, the energy storage device 90 may have a capacity of from 150 Wh to 160 Wh.

In some embodiments, the energy storage device 90 may have a capacity of from 50 Wh to 150 Wh. In some embodiments, the energy storage device 90 may have a capacity of from 55 Wh to 150 Wh. In some embodiments, the energy storage device 90 may have a capacity of from 60 Wh to 150 Wh. In some embodiments, the energy storage device 90 may have a capacity of from 65 Wh to 150 Wh. In some embodiments, the energy storage device 90 may have a capacity of from 70 Wh to 150 Wh. In some embodiments, the energy storage device 90 may have a capacity of from 75 Wh to 150 Wh. In some embodiments, the energy storage device 90 may have a capacity of from 80 Wh to 150 Wh. In some embodiments, the energy storage device 90 may have a capacity of from 85 Wh to 150 Wh. In some embodiments, the energy storage device 90 may have a capacity of from 90 Wh to 150 Wh. In some embodiments, the energy storage device 90 may have a capacity of from 95 Wh to 150 Wh. In some embodiments, the energy storage device 90 may have a capacity of from 100 Wh to 150 Wh. In some embodiments, the energy storage device 90 may have a capacity of from 110 Wh to 150 Wh. In some embodiments, the energy storage device 90 may have a capacity of from 120 Wh to 150 Wh. In some embodiments, the energy storage device 90 may have a capacity of from 130 Wh to 150 Wh. In some embodiments, the energy storage device 90 may have a capacity of from 140 Wh to 150 Wh.

In some embodiments, the energy storage device 90 may have a capacity of from 50 Wh to 140 Wh. In some embodiments, the energy storage device 90 may have a capacity of from 55 Wh to 140 Wh. In some embodiments, the energy storage device 90 may have a capacity of from 60 Wh to 140 Wh. In some embodiments, the energy storage device 90 may have a capacity of from 65 Wh to 140 Wh. In some embodiments, the energy storage device 90 may have a capacity of from 70 Wh to 140 Wh. In some embodiments, the energy storage device 90 may have a capacity of from 75 Wh to 140 Wh. In some embodiments, the energy storage device 90 may have a capacity of from 80 Wh to 140 Wh. In some embodiments, the energy storage device 90 may have a capacity of from 85 Wh to 140 Wh. In some embodiments, the energy storage device 90 may have a capacity of from 90 Wh to 140 Wh. In some embodiments, the energy storage device 90 may have a capacity of from 95 Wh to 140 Wh. In some embodiments, the energy storage device 90 may have a capacity of from 100 Wh to 140 Wh. In some embodiments, the energy storage device 90 may have a capacity of from 110 Wh to 140 Wh. In some embodiments, the energy storage device 90 may have a capacity of from 120 Wh to 140 Wh. In some embodiments, the energy storage device 90 may have a capacity of from 130 Wh to 140 Wh.

In some embodiments, the energy storage device 90 may have a capacity of from 50 Wh to 130 Wh. In some embodiments, the energy storage device 90 may have a capacity of from 55 Wh to 130 Wh. In some embodiments, the energy storage device 90 may have a capacity of from 60 Wh to 130 Wh. In some embodiments, the energy storage device 90 may have a capacity of from 65 Wh to 130 Wh. In some embodiments, the energy storage device 90 may have a capacity of from 70 Wh to 130 Wh. In some embodiments, the energy storage device 90 may have a capacity of from 75 Wh to 130 Wh. In some embodiments, the energy storage device 90 may have a capacity of from 80 Wh to 130 Wh. In some embodiments, the energy storage device 90 may have a capacity of from 85 Wh to 130 Wh. In some embodiments, the energy storage device 90 may have a capacity of from 90 Wh to 130 Wh. In some embodiments, the energy storage device 90 may have a capacity of from 95 Wh to 130 Wh. In some embodiments, the energy storage device 90 may have a capacity of from 100 Wh to 130 Wh. In some embodiments, the energy storage device 90 may have a capacity of from 110 Wh to 130 Wh. In some embodiments, the energy storage device 90 may have a capacity of from 120 Wh to 130 Wh.

In some embodiments, the energy storage device 90 may have a capacity of from 50 Wh to 120 Wh. In some embodiments, the energy storage device 90 may have a capacity of from 55 Wh to 120 Wh. In some embodiments, the energy storage device 90 may have a capacity of from 60 Wh to 120 Wh. In some embodiments, the energy storage device 90 may have a capacity of from 65 Wh to 120 Wh. In some embodiments, the energy storage device 90 may have a capacity of from 70 Wh to 120 Wh. In some embodiments, the energy storage device 90 may have a capacity of from 75 Wh to 120 Wh. In some embodiments, the energy storage device 90 may have a capacity of from 80 Wh to 120 Wh. In some embodiments, the energy storage device 90 may have a capacity of from 85 Wh to 120 Wh. In some embodiments, the energy storage device 90 may have a capacity of from 90 Wh to 120 Wh. In some embodiments, the energy storage device 90 may have a capacity of from 95 Wh to 120 Wh. In some embodiments, the energy storage device 90 may have a capacity of from 100 Wh to 120 Wh. In some embodiments, the energy storage device 90 may have a capacity of from 110 Wh to 120 Wh.

In some embodiments, the energy storage device 90 may have a capacity of from 50 Wh to 110 Wh. In some embodiments, the energy storage device 90 may have a capacity of from 55 Wh to 110 Wh. In some embodiments, the energy storage device 90 may have a capacity of from 60 Wh to 110 Wh. In some embodiments, the energy storage device 90 may have a capacity of from 65 Wh to 110 Wh. In some embodiments, the energy storage device 90 may have a capacity of from 70 Wh to 110 Wh. In some embodiments, the energy storage device 90 may have a capacity of from 75 Wh to 110 Wh. In some embodiments, the energy storage device 90 may have a capacity of from 80 Wh to 110 Wh. In some embodiments, the energy storage device 90 may have a capacity of from 85 Wh to 110 Wh. In some embodiments, the energy storage device 90 may have a capacity of from 90 Wh to 110 Wh. In some embodiments, the energy storage device 90 may have a capacity of from 95 Wh to 110 Wh. In some embodiments, the energy storage device 90 may have a capacity of from 100 Wh to 110 Wh.

In some embodiments, the energy storage device 90 may have a capacity of from 50 Wh to 100 Wh. In some embodiments, the energy storage device 90 may have a capacity of from 55 Wh to 100 Wh. In some embodiments, the energy storage device 90 may have a capacity of from 60 Wh to 100 Wh. In some embodiments, the energy storage device 90 may have a capacity of from 65 Wh to 100 Wh. In some embodiments, the energy storage device 90 may have a capacity of from 70 Wh to 100 Wh. In some embodiments, the energy storage device 90 may have a capacity of from 75 Wh to 100 Wh. In some embodiments, the energy storage device 90 may have a capacity of from 80 Wh to 100 Wh. In some embodiments, the energy storage device 90 may have a capacity of from 85 Wh to 100 Wh. In some embodiments, the energy storage device 90 may have a capacity of from 90 Wh to 100 Wh. In some embodiments, the energy storage device 90 may have a capacity of from 95 Wh to 100 Wh.

In some embodiments, the energy storage device 90 may have a capacity of from 50 Wh to 95 Wh. In some embodiments, the energy storage device 90 may have a capacity of from 55 Wh to 95 Wh. In some embodiments, the energy storage device 90 may have a capacity of from 60 Wh to 95 Wh. In some embodiments, the energy storage device 90 may have a capacity of from 65 Wh to 95 Wh. In some embodiments, the energy storage device 90 may have a capacity of from 70 Wh to 95 Wh. In some embodiments, the energy storage device 90 may have a capacity of from 75 Wh to 95 Wh. In some embodiments, the energy storage device 90 may have a capacity of from 80 Wh to 95 Wh. In some embodiments, the energy storage device 90 may have a capacity of from 85 Wh to 95 Wh. In some embodiments, the energy storage device 90 may have a capacity of from 90 Wh to 95 Wh.

In some embodiments, the energy storage device 90 may have a capacity of from 50 Wh to 90 Wh. In some embodiments, the energy storage device 90 may have a capacity of from 55 Wh to 90 Wh. In some embodiments, the energy storage device 90 may have a capacity of from 60 Wh to 90 Wh. In some embodiments, the energy storage device 90 may have a capacity of from 65 Wh to 90 Wh. In some embodiments, the energy storage device 90 may have a capacity of from 70 Wh to 90 Wh. In some embodiments, the energy storage device 90 may have a capacity of from 75 Wh to 90 Wh. In some embodiments, the energy storage device 90 may have a capacity of from 80 Wh to 90 Wh. In some embodiments, the energy storage device 90 may have a capacity of from 85 Wh to 90 Wh.

In some embodiments, the energy storage device 90 may have a capacity of from 50 Wh to 85 Wh. In some embodiments, the energy storage device 90 may have a capacity of from 55 Wh to 85 Wh. In some embodiments, the energy storage device 90 may have a capacity of from 60 Wh to 85 Wh. In some embodiments, the energy storage device 90 may have a capacity of from 65 Wh to 85 Wh. In some embodiments, the energy storage device 90 may have a capacity of from 70 Wh to 85 Wh. In some embodiments, the energy storage device 90 may have a capacity of from 75 Wh to 85 Wh. In some embodiments, the energy storage device 90 may have a capacity of from 80 Wh to 85 Wh.

In some embodiments, the energy storage device 90 may have a capacity of from 50 Wh to 80 Wh. In some embodiments, the energy storage device 90 may have a capacity of from 55 Wh to 80 Wh. In some embodiments, the energy storage device 90 may have a capacity of from 60 Wh to 80 Wh. In some embodiments, the energy storage device 90 may have a capacity of from 65 Wh to 80 Wh. In some embodiments, the energy storage device 90 may have a capacity of from 70 Wh to 80 Wh. In some embodiments, the energy storage device 90 may have a capacity of from 75 Wh to 80 Wh.

In some embodiments, the energy storage device 90 may have a capacity of from 50 Wh to 75 Wh. In some embodiments, the energy storage device 90 may have a capacity of from 55 Wh to 75 Wh. In some embodiments, the energy storage device 90 may have a capacity of from 60 Wh to 75 Wh. In some embodiments, the energy storage device 90 may have a capacity of from 65 Wh to 75 Wh. In some embodiments, the energy storage device 90 may have a capacity of from 70 Wh to 75 Wh.

In some embodiments, the energy storage device 90 may have a capacity of from 50 Wh to 70 Wh. In some embodiments, the energy storage device 90 may have a capacity of from 55 Wh to 70 Wh. In some embodiments, the energy storage device 90 may have a capacity of from 60 Wh to 70 Wh. In some embodiments, the energy storage device 90 may have a capacity of from 65 Wh to 70 Wh.

In some embodiments, the energy storage device 90 may have a capacity of from 50 Wh to 65 Wh. In some embodiments, the energy storage device 90 may have a capacity of from 55 Wh to 65 Wh. In some embodiments, the energy storage device 90 may have a capacity of from 60 Wh to 65 Wh.

In some embodiments, the energy storage device 90 may have a capacity of from 50 Wh to 60 Wh. In some embodiments, the energy storage device 90 may have a capacity of from 55 Wh to 60 Wh. In some embodiments, the energy storage device 90 may have a capacity of from 50 Wh to 55 Wh.

In some embodiments, the energy storage device 90 may have a capacity of 250 Wh. In some embodiments, the energy storage device 90 may have a capacity of 300 Wh. In some embodiments, the energy storage device 90 may have a capacity of 350 Wh. In some embodiments, the energy storage device 90 may have a capacity of 400 Wh. In some embodiments, the energy storage device 90 may have a capacity of 450 Wh. In some embodiments, the energy storage device 90 may have a capacity of 500 Wh.

In some embodiments, the energy storage device 90 may have a capacity of from 250 Wh to 500 Wh. In some embodiments, the energy storage device 90 may have a capacity of from 300 Wh to 500 Wh. In some embodiments, the energy storage device 90 may have a capacity of from 350 Wh to 500 Wh. In some embodiments, the energy storage device 90 may have a capacity of from 400 Wh to 500 Wh. In some embodiments, the energy storage device 90 may have a capacity of from 450 Wh to 500 Wh.

In some embodiments, the energy storage device 90 may have a capacity of from 200 Wh to 450 Wh. In some embodiments, the energy storage device 90 may have a capacity of from 250 Wh to 450 Wh. In some embodiments, the energy storage device 90 may have a capacity of from 300 Wh to 450 Wh. In some embodiments, the energy storage device 90 may have a capacity of from 350 Wh to 450 Wh. In some embodiments, the energy storage device 90 may have a capacity of from 400 Wh to 450 Wh.

In some embodiments, the energy storage device 90 may have a capacity of from 200 Wh to 400 Wh. In some embodiments, the energy storage device 90 may have a capacity of from 250 Wh to 400 Wh. In some embodiments, the energy storage device 90 may have a capacity of from 300 Wh to 400 Wh. In some embodiments, the energy storage device 90 may have a capacity of from 350 Wh to 400 Wh.

In some embodiments, the energy storage device 90 may have a capacity of from 200 Wh to 350 Wh. In some embodiments, the energy storage device 90 may have a capacity of from 250 Wh to 350 Wh. In some embodiments, the energy storage device 90 may have a capacity of from 300 Wh to 350 Wh. In some embodiments, the energy storage device 90 may have a capacity of from 200 Wh to 300 Wh. In some embodiments, the energy storage device 90 may have a capacity of from 250 Wh to 300 Wh.

In some embodiments, the system 70 with a plurality of photovoltaic modules 10 may produce from 1 Kw to 100 Kw. In some embodiments, the system 70 may produce 1 Kw. In some embodiments, the system 70 may produce 10 Kw. In some embodiments, the system 70 may produce 20 Kw. In some embodiments, the system 70 may produce 30 Kw. In some embodiments, the system 70 may produce 40 Kw. In some embodiments, the system 70 may produce 50 Kw. In some embodiments, the system 70 may produce 60 Kw. In some embodiments, the system 70 may produce 70 Kw. In some embodiments, the system 70 may produce 80 Kw. In some embodiments, the system 70 may produce 90 Kw. In some embodiments, the system 70 may produce 100 Kw.

In some embodiments, the system 70 may produce more than 1 Kw. In some embodiments, the system 70 may produce more than 10 Kw. In some embodiments, the system 70 may produce more than 20 Kw. In some embodiments, the system 70 may produce more than 30 Kw. In some embodiments, the system 70 may produce more than 40 Kw. In some embodiments, the system 70 may produce more than 50 Kw. In some embodiments, the system 70 may produce more than 60 Kw. In some embodiments, the system 70 may produce more than 70 Kw. In some embodiments, the system 70 may produce more than 80 Kw. In some embodiments, the system 70 may produce more than 90 Kw. In some embodiments, the system 70 may produce more than 100 Kw.

In some embodiments, the system 70 may produce less than 1 Kw. In some embodiments, the system 70 may produce less than 10 Kw. In some embodiments, the system 70 may produce less than 20 Kw. In some embodiments, the system 70 may produce less than 30 Kw. In some embodiments, the system 70 may produce less than 40 Kw. In some embodiments, the system 70 may produce less than 50 Kw. In some embodiments, the system 70 may produce less than 60 Kw. In some embodiments, the system 70 may produce less than 70 Kw. In some embodiments, the system 70 may produce less than 80 Kw. In some embodiments, the system 70 may produce less than 90 Kw. In some embodiments, the system 70 may produce less than 100 Kw.

In some embodiments, the system 70 may produce from 1 Kw to 100 Kw. In some embodiments, the system 70 may produce from 10 Kw to 100 Kw. In some embodiments, the system 70 may produce from 20 Kw to 100 Kw. In some embodiments, the system 70 may produce from 30 Kw to 100 Kw. In some embodiments, the system 70 may produce from 40 Kw to 100 Kw. In some embodiments, the system 70 may produce from 50 Kw to 100 Kw. In some embodiments, the system 70 may produce from 60 Kw to 100 Kw. In some embodiments, the system 70 may produce from 70 Kw to 100 Kw. In some embodiments, the system 70 may produce from 80 Kw to 100 Kw. In some embodiments, the system 70 may produce from 90 Kw to 100 Kw.

In some embodiments, the system 70 may produce from 1 Kw to 90 Kw. In some embodiments, the system 70 may produce from 10 Kw to 90 Kw. In some embodiments, the system 70 may produce from 20 Kw to 90 Kw. In some embodiments, the system 70 may produce from 30 Kw to 90 Kw. In some embodiments, the system 70 may produce from 40 Kw to 90 Kw. In some embodiments, the system 70 may produce from 50 Kw to 90 Kw. In some embodiments, the system 70 may produce from 60 Kw to 90 Kw. In some embodiments, the system 70 may produce from 70 Kw to 90 Kw. In some embodiments, the system 70 may produce from 80 Kw to 90 Kw.

In some embodiments, the system 70 may produce from 1 Kw to 80 Kw. In some embodiments, the system 70 may produce from 10 Kw to 80 Kw. In some embodiments, the system 70 may produce from 20 Kw to 80 Kw. In some embodiments, the system 70 may produce from 30 Kw to 80 Kw. In some embodiments, the system 70 may produce from 40 Kw to 80 Kw. In some embodiments, the system 70 may produce from 50 Kw to 80 Kw. In some embodiments, the system 70 may produce from 60 Kw to 80 Kw. In some embodiments, the system 70 may produce from 70 Kw to 80 Kw.

In some embodiments, the system 70 may produce from 1 Kw to 70 Kw. In some embodiments, the system 70 may produce from 10 Kw to 70 Kw. In some embodiments, the system 70 may produce from 20 Kw to 70 Kw. In some embodiments, the system 70 may produce from 30 Kw to 70 Kw. In some embodiments, the system 70 may produce from 40 Kw to 70 Kw. In some embodiments, the system 70 may produce from 50 Kw to 70 Kw. In some embodiments, the system 70 may produce from 60 Kw to 70 Kw.

In some embodiments, the system 70 may produce from 1 Kw to 60 Kw. In some embodiments, the system 70 may produce from 10 Kw to 60 Kw. In some embodiments, the system 70 may produce from 20 Kw to 60 Kw. In some embodiments, the system 70 may produce from 30 Kw to 60 Kw. In some embodiments, the system 70 may produce from 40 Kw to 60 Kw. In some embodiments, the system 70 may produce from 50 Kw to 60 Kw.

In some embodiments, the system 70 may produce from 1 Kw to 50 Kw. In some embodiments, the system 70 may produce from 10 Kw to 50 Kw. In some embodiments, the system 70 may produce from 20 Kw to 50 Kw. In some embodiments, the system 70 may produce from 30 Kw to 50 Kw. In some embodiments, the system 70 may produce from 40 Kw to 50 Kw.

In some embodiments, the system 70 may produce from 1 Kw to 40 Kw. In some embodiments, the system 70 may produce from 10 Kw to 40 Kw. In some embodiments, the system 70 may produce from 20 Kw to 40 Kw. In some embodiments, the system 70 may produce from 30 Kw to 40 Kw.

In some embodiments, the system 70 may produce from 1 Kw to 30 Kw. In some embodiments, the system 70 may produce from 10 Kw to 30 Kw. In some embodiments, the system 70 may produce from 20 Kw to 30 Kw.

In some embodiments, the system 70 may produce from 1 Kw to 20 Kw. In some embodiments, the system 70 may produce from 10 Kw to 20 Kw. In some embodiments, the system 70 may produce from 1 Kw to 10 Kw.

In some embodiments, one or both of the wiring 100 and/or the wiring 110 may be in the form of one or more individual wires, or bussing. In some embodiments, one or both of the wiring 100 and/or the wiring 110 may be flat ribbon wiring. In some embodiments, one or both of the wiring 100 and/or the wiring 110 may be round wiring. In some embodiments, one or both of the wiring 100 and/or the wiring 110 may be an electrical cable.

In some embodiments, the present invention provides a method, comprising obtaining one or more of the photovoltaic modules 10, and installing the photovoltaic modules 10 above the roof deck 72, such as in an array on the roof deck 72, as shown in FIG. 4. In some embodiments, the method includes electrically connecting the photovoltaic modules 10 to one another; electrically connecting the photovoltaic modules 10 to an electrical component, such as an inverter or an electric panel of a structure.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed is:

1. A system, comprising:
   a plurality of photovoltaic modules installed on a roof deck,
      wherein each of the photovoltaic modules includes
         at least one solar cell,
         an encapsulant encapsulating the at least one solar cell,
            wherein the encapsulant includes a first surface and a
            second surface opposite the first surface,
         a frontsheet juxtaposed with the first surface of the encapsulant,
         a backsheet juxtaposed with the second surface of the encapsulant,
         a headlap portion,
            wherein the headlap portion includes a nail zone,
            wherein the photovoltaic module is installed on the roof deck by a plurality of fasteners through the nail zone of the headlap portion, and
         an energy storage device,
            wherein the energy storage device is affixed to a surface of the backsheet and disposed outside the nail zone of the headlap portion, and
            wherein the energy storage device is in electrical communication with the at least one solar cell.

2. The system of claim 1, wherein the energy storage device comprises a battery or a capacitor.

3. The system of claim 1, wherein each of the photovoltaic modules includes an electronics assembly electrically connecting the at least one solar cell with the energy storage device.

4. The system of claim 3, wherein the electronics assembly is on a lower surface of the backsheet.

5. The system of claim 3, wherein the electronics assembly is on an upper surface of the backsheet.

6. The system of claim 3, wherein each of the photovoltaic modules includes a side lap, wherein the side lap includes an upper surface, and wherein the electronics assembly is on the upper surface of the side lap.

7. The system of claim 3, wherein the electronics assembly comprises a controller configured to control at least one of charging of the energy storage device and discharging of the energy storage device.

8. The system of claim 1, wherein the energy storage device has a thickness of 0.2 mm to 10 mm.

9. The system of claim 1, wherein the at least one fastener includes a plurality of fasteners.

10. A photovoltaic module, comprising:
    at least one solar cell;
    an encapsulant encapsulating the at least one solar cell,
       wherein the encapsulant includes a first surface and a second surface opposite the first surface;
    a frontsheet juxtaposed with the first surface of the encapsulant;
    a backsheet juxtaposed with the second surface of the encapsulant;

a headlap portion,
wherein the headlap portion includes a nail zone;
wherein the photovoltaic module is configured to be installed on a roof deck by a plurality of fasteners through the nail zone of the headlap portion; and
an energy storage device,
wherein the energy storage device is affixed to a surface of the backsheet and disposed outside the nail zone of the headlap portion, and
wherein the energy storage device is in electrical communication with the at least one solar cell.

11. The photovoltaic module of claim 10, wherein the energy storage device comprises a battery or a capacitor.

12. The photovoltaic module of claim 10, wherein the energy storage device is attached to a bottom surface of the backsheet.

13. The photovoltaic module of claim 10, further comprising an electronics assembly electrically communicating the at least one solar cell with the energy storage device.

14. A method, comprising:
obtaining a plurality of photovoltaic modules,
wherein each of the photovoltaic modules includes
at least one solar cell,
an encapsulant encapsulating the at least one solar cell, wherein the encapsulant includes a first surface and a second surface opposite the first surface,
a frontsheet juxtaposed with the first surface of the encapsulant,
a backsheet juxtaposed with the second surface of the encapsulant, and
a headlap portion,
wherein the headlap portion includes a nail zone, and
an energy storage device,
wherein the energy storage device is affixed to a surface of the backsheet and disposed outside the nail zone of the headlap portion, and
wherein the energy storage device is in electrical communication with the at least one solar cell; and
installing the photovoltaic modules on a roof deck,
wherein each of the photovoltaic modules is installed on the roof deck with a plurality of fasteners through the nail zone of the headlap portion, and
wherein the energy storage device is between the roof deck and the backsheet.

15. The system of claim 1, wherein the energy storage device is between the backsheet and the roof deck.

16. The system of claim 1, wherein the energy storage device is between the at least one solar cell and the backsheet.

17. The photovoltaic module of claim 10, wherein the energy storage device is between the backsheet and the roof deck.

18. The photovoltaic module of claim 10, wherein the energy storage device is below the backsheet.

* * * * *